United States Patent
Gesell et al.

(10) Patent No.: US 12,314,491 B2
(45) Date of Patent: May 27, 2025

(54) TRACKING TOUCHPAD TOUCH INPUT

(71) Applicant: Microsoft Technology Licensing, LLC, Redmond, WA (US)

(72) Inventors: Molly Jo Gesell, Bothell, WA (US); Tal Bizinsky Tovel, Ramat HaSharon (IL); Arthur Gershfeld, Holon (IL); Hila Malihi, Jerusalem (IL); Robert Bryce Johnson, Sammamish, WA (US); Solomon Stone Romney, Bellevue, WA (US); Elizabeth Ann Pina, Lynnwood, WA (US); Adam Benjamin Meshi, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/537,373

(22) Filed: Dec. 12, 2023

(65) Prior Publication Data
US 2025/0093980 A1 Mar. 20, 2025

Related U.S. Application Data

(60) Provisional application No. 63/583,937, filed on Sep. 20, 2023.

(51) Int. Cl.
*G06F 3/0354* (2013.01)
(52) U.S. Cl.
CPC ............... *G06F 3/03547* (2013.01)
(58) Field of Classification Search
CPC . G06F 3/03547; G06F 3/0393; G06F 3/04186
See application file for complete search history.

(56) References Cited

U.S. PATENT DOCUMENTS 8,334,849 B2 12/2012 Murphy
9,354,757 B2 5/2016 Miyamoto
(Continued)

FOREIGN PATENT DOCUMENTS

CN 103970322 B 9/2017
CN 112286386 A 1/2021
(Continued)

OTHER PUBLICATIONS

International Search Report and Written Opinion received for PCT Application No. PCT/US2024/045901, Dec. 16, 2024, 14 pages.

*Primary Examiner* — Kevin M Nguyen
(74) *Attorney, Agent, or Firm* — Alleman Hall & Tuttle LLP

(57) ABSTRACT

A computing device comprises a touch sensing touchpad, a processor, and memory storing instructions to detect contacts at the touchpad over a plurality of frames of data. At each frame a measured coordinate and a current plurality of characteristics of the contacts are determined. The current plurality of characteristics of a current frame are compared to characteristics of an immediately prior frame. Where at least one of the comparisons satisfies a corresponding threshold, a coordinate jump is detected between the current frame and the immediately prior frame. Based at least on detecting the coordinate jump, a current frame intermediate coordinate value is set to an immediately prior frame intermediate coordinate value of the immediately prior frame, and a smoothing filter is applied to the immediately prior frame intermediate coordinate value to generate a smoothed immediately prior frame intermediate coordinate value, which is outputted.

20 Claims, 23 Drawing Sheets

(56) References Cited

U.S. PATENT DOCUMENTS

| | | | |
|---|---|---|---|
| 9,507,454 B1* | 11/2016 | Koblyuk | G06F 3/04186 |
| 11,526,237 B1 | 12/2022 | Lim | |
| 2016/0098142 A1 | 4/2016 | Winebrand | |
| 2020/0301560 A1 | 9/2020 | Shi et al. | |
| 2020/0388012 A1 | 12/2020 | Wan | |
| 2021/0081096 A1 | 3/2021 | Wu et al. | |
| 2022/0147246 A1 | 5/2022 | Rosenberg | |
| 2023/0094855 A1 | 3/2023 | So et al. | |
| 2023/0195258 A1 | 6/2023 | Lim | |

FOREIGN PATENT DOCUMENTS

| | | |
|---|---|---|
| CN | 109918247 B | 8/2022 |
| CN | 114461090 B | 1/2023 |
| CN | 114995675 B | 4/2023 |
| EP | 3510476 B1 | 8/2021 |

* cited by examiner

| Parameter Name | Description | Default Value Range |
|---|---|---|
| CenterOfMassThr | Junctions above the threshold are taken into center of mass calculation. | 0.01 – 0.04 |
| HotJuncThr | Junctions above the threshold counted as hot junctions. | 0.02 – 0.05 |
| BoundBoxThr | Junctions above the thresholds are taken for the bounding box calculation. | 0.01 – 0.04 |
| SignBlobThr | Blobs with maximal value above the threshold are counted as significant. | 0.05 – 0.2 |
| SignBlobHyst | Hysteresis for the significant blobs threshold. The value is subtracted from SignBlobThr if number of significant blobs at the cycle is smaller than at the previous cycle. | 0.02 – 1.4 |

FIG. 18

| Parameter Name | Description | Default Value |
|---|---|---|
| FingerUpThr | Threshold for touch validity, maximal junction should be above the threshold. | 0.04 – 0.12 |
| BigObjectHotJuncThr | Track becomes big contact track if number of hot junctions is above the threshold. | 12 - 20 |
| BigObjectBoundBoxThr | Track becomes big contact track if bounding box on one of the axes is above the threshold. | 2 - 5 |
| MinimalForceThr | Touch with force below the threshold detected as jump | 7 - 15 |
| HotJuncDiffThr | Difference of number of hot junctions with previous frame. Value above the threshold detects jump. | 8 - 14 |
| HotJuncDiffThr_2 | Difference of number of hot junctions with frame n-2. Value above the threshold detects jump. | 12 - 20 |
| HotJuncRelThr | Ratio of number of hot junctions with previous frame. Value below the threshold or above 1/threshold detects jump. | 1/4 – 3/4 |
| HotJuncRelThr_2 | Ratio of number of hot junctions with frame n-2. Value below the threshold or above 1/threshold detects jump. | 3/9 – 6/9 |
| HotJuncSumThr | Difference of hot junctions sum with previous frame divided by the minimal value of current and previous frame. Number above the threshold detects jump. | 0.1 – 0.3 |

FIG. 19A

| | | |
|---|---|---|
| *BoundBoxDiffThr* | Difference of bounding box with previous frame. Number above the threshold detects jump. | 2 - 8 |
| *BoundBoxRelThr* | Ratio of bounding box with previous frame. Ratio below the threshold or above 1/threshold detected as jump. | 2/5 – 4/5 |
| *MinSignBlobDiffThr* | Difference of minimal significant blob maximal value with previous frame. Value above the threshold detected as jump. | 0.05 – 0.09 |
| *HotJuncMediumThr* | Number of hot junctions above the threshold defines track as medium. | 25 - 60 |
| *HotJuncBigThr* | Number of hot junctions above the threshold defines track as big. | 60 - 80 |
| *JitRestSmallThr* | Jitter restrictor range for small track | 0.3mm – 0.8mm |
| *JitRestMediumThr* | Jitter restrictor range for medium track. | 0.5mm – 1.0mm |
| *JitRestBigThr* | Jitter restrictor range for big track | 0.8mm – 1.2mm |
| *ForceThrUp* | Force threshold for force up event. | 180 - 210 |
| *ForceDiffThrUp* | Force gradient threshold for force up event. | 30 - 50 |

FIG. 19B

| | | |
|---|---|---|
| *ForceCounterUp* | Number of frames for force mode after the force up event. | 20 - 50 |
| *ForceMinimalForGrad* | Minimal force to check force gradient for force up event. | 40 - 60 |
| *ForceThrDown* | Force threshold for threshold down event. | 90 - 120 |
| *ForceDiffThrDown* | Force gradient threshold for force down event. | 30 – 50 |
| *ForceCounterDown* | Number of frames for force mode after the force down event. | 25 - 50 |
| *DoubleTapCounterThr* | Number of frames with double tap flag after the force down event. | 35 - 70 |
| *ForceJitResAddUpSmall* | Addition to jitter restrictor of small track at force mode after force up event. | 0.3mm – 0.9mm |
| *ForceJitResAddUpMedium* | Addition to jitter restrictor of medium track at force mode after force up event. | 0.60mm – 0.85mm |
| *ForceJitResAddUpBig* | Addition to jitter restrictor of big track at force mode after force up event. | 0.8mm – 1.2mm |
| *ForceJitResAddDownSmall* | Addition to jitter restrictor of small track at force mode after force down event. | 0.3mm – 0.7mm |
| *ForceJitResAddDownMedium* | Addition to jitter restrictor of medium track at force mode after force down event. | 0.5mm – 0.9mm |
| *ForceJitResAddDownBig* | Addition to jitter restrictor of big track at force mode after force down event. | 0.8mm – 1.2mm |
| *NumOfCyclesForRestriction* | Number of cycles with distance below jitter restrictor range divided by two for entering the Restrict state of the jitter restrictor. | 8 - 12 |
| *SmoothingAlpha* | Exponential averaging smoothing filter coefficient. | 0.6 – 1.0 |

FIG. 19C

TRACKING TOUCHPAD TOUCH INPUT

CROSS REFERENCE TO RELATED APPLICATIONS

This application claims priority to U.S. Provisional Application Ser. No. 63/583,937, filed Sep. 20, 2023, the entirety of which is hereby incorporated herein by reference for all purposes.

BACKGROUND

Some computing devices include a capacitive sensing touchpad for receiving user inputs. Differently abled users can have challenges using capacitive sensing touchpads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to touchpads, computing devices, and related methods for tracking touch input on a capacitive touch sensing touchpad. In some examples, configurations of the present disclosure include a method for tracking touch input on a capacitive touch sensing touchpad in a computing device. The method comprises detecting a plurality of contacts at a plurality of capacitive touch antennas of the touchpad over a plurality of frames of data, where the plurality of contacts are produced by an object contacting the touchpad. At each frame of the plurality of frames of data the method includes: determining a measured coordinate of the plurality of contacts, and determining a current plurality of characteristics of the plurality of contacts. The method includes comparing the current plurality of characteristics of the contacts of a current frame of data to a prior plurality of the characteristics of the contacts of at least an immediately prior frame of data.

In some examples, the method determines that at least one of the comparisons of the characteristics satisfies a corresponding threshold. Based at least on determining that at least one comparison of the characteristics satisfies the corresponding threshold, the method determines that a coordinate jump is detected between the current frame of data and the immediately prior frame of data. Based at least on determining that the coordinate jump is detected, the method: sets a current frame intermediate coordinate value to an immediately prior frame intermediate coordinate value of the immediately prior frame, and applies a smoothing filter to the immediately prior frame intermediate coordinate value to generate a smoothed immediately prior frame intermediate coordinate value. The method then outputs the smoothed immediately prior frame intermediate coordinate value.

BRIEF DESCRIPTION OF THE DRAWINGS

FIG. 18 is a table of example value ranges for thresholds and parameters for different configurations of touchpads and computing devices with which the techniques of the present disclosure can be implemented.

FIGS. 19A-19C are tables of example value ranges for thresholds and parameters for different configurations of touchpads and computing devices with which the techniques of the present disclosure can be implemented.

DETAILED DESCRIPTION

Figure 1:
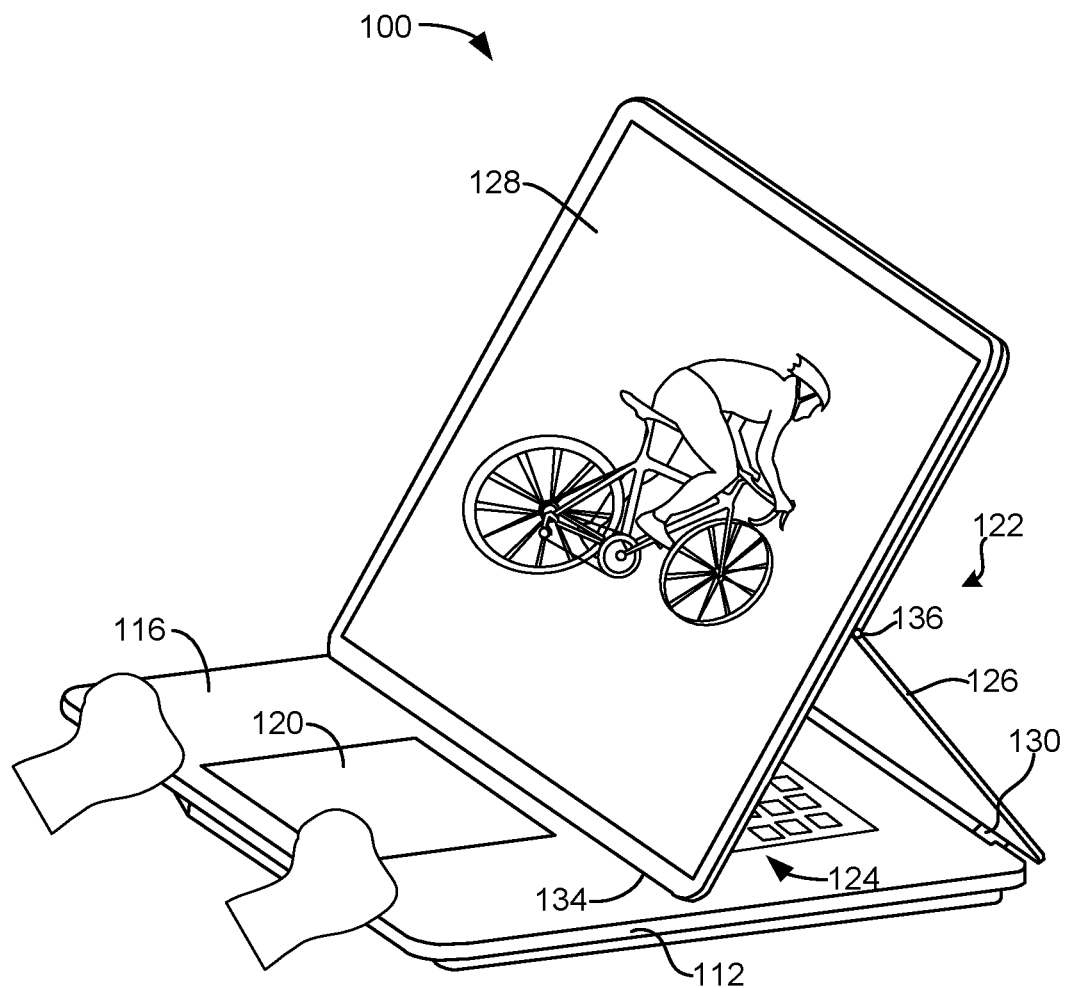
FIG. 1 shows one example of a computing device utilizing a touchpad according to examples of the present disclosure.

Some computing devices include a capacitive touch sensing touchpad for receiving user inputs. In some examples these touchpads can also determine various magnitudes of force being applied to their surfaces.

Some touchpads actively filter out non-finger contacts to prevent unintended inputs caused by inadvertent contact with the touchpad. However, some users are unable to effectively interact with touchpads using a single finger. For example, users with chronic hand pain or a limb difference can find interacting with these touchpads challenging. For example, some users touch the touchpad with multiple fingers, knuckles, a palm at different postures, or separate palm fragments. Such users can find it challenging to precisely use the touchpad to provide the inputs they intend to provide. Such inputs can include navigation of a visual cue (cursor) that indicates a position, choosing an object, clicking, double clicking, right clicking, and dragging the object.

When touchpads are utilized in this manner, challenges with processing these inputs can arise, such as (1) generation of unclear clear touch coordinates, for example when large non-finger objects and/or separated fragments of objects are used for touch interaction; (2) jumps of the measured coordinate while the object makes contact with the touchpad (touch down), leaves contact with the touchpad (touch up), moves along the touchpad, and/or changes its appearance during contact, such as the addition or removal of fragments or a change of the palm posture; (3) encountering significant jitter of the measured coordinates of the touch object, such as with multi-fragment objects; and (4) experiencing touch coordinate drift while the contacting object increases or decreases force on the touchpad, such as during clicks and drag and drop operations.

Accordingly, and as described in more detail below, configurations of the present disclosure provide touchpad signal processing and related methods that enable users to effectively utilize a touchpad and provide precise and intended user inputs with contact from non-fingertip body part(s). For example, configurations of the present disclosure enable persons to use the side of their hand, another part of their hand, one or more knuckles, an elbow, partial thumb, palm or partial palm, or other non-finger input to provide touch input via the touchpad.

As described further below, configurations of the present disclosure calculate a measured coordinate, such as the center of mass, of the contacting object using signals from all of the touchpad antennas (sensors) registering contact across the touchpad. In this manner and in one potential advantage, a single touch coordinate is generated and processed in a manner that accommodates larger and/or multiple contact areas, and can be utilized to provide precise and user-intended input. Additionally, configurations of the present disclosure calculate a plurality of characteristics of the contact with the touch pad. In another advantage and as described further below, these characteristics help to prevent coordinate jumps and enable performance of enhanced jitter restriction and smoothing of coordinate movement.

With reference now to FIGS. 1-8 and 21, an example computing device 100 is illustrated in the form of a laptop computer that includes a capacitive touch and force sensing touchpad 120 for tracking touch input on the touchpad according to aspects of the present disclosure. In other examples, touchpads of the present disclosure can be implemented in tablet computing devices, foldable computing devices including multiple touch screens, wearable and other mobile computing devices, and any other type of computing device that utilizes a touchpad.

The following examples discuss aspects of the present disclosure in the context of the configuration of FIGS. 1-8 and 21. In other examples, a variety of other capacitance-based force sensing touchpad configurations can be utilized to practice the techniques of the present disclosure.

In this example computing device 100 includes a chassis 112 that includes a planar user interactive surface 116 comprising a touchpad 120 and a keyboard 124. Computing device 100 also includes a touch-sensitive display 128 that is rotatably coupled to chassis 112 via a display positioning assembly 122. The display 128 may have any suitable size, resolution, and utilize any suitable display technology. As examples, the display 128 may be a liquid crystal display (LCD), light emitting diode (LED) display, plasma display, quantum dot display (QLED), e-ink/e-paper display, or other suitable display type. Additional details regarding the components and computing aspects of computing device 100 are described in more detail below with reference to the example computing system of FIG. 21.

In the present example, the display positioning assembly 122 enables multiple operating orientations and positionings of display 128 that provide a user with different modes of interacting with the computing device 100. The display positioning assembly 122 includes a collapsible support member 126 that is rotatably connected to the chassis 112 at a hinge 130. The bottom edge 134 of display 128 is not rigidly affixed to the user interactive surface 116 of the chassis 112. Rather, the bottom edge 134 of display 128 is moveable to any of a range of securable display positions along the user interactive surface 116.

In some examples, the collapsible support member 126 is moveably coupled to the display 128 via a living hinge 136. In other examples, the collapsible support member 126 may be moveably coupled to the display 128 via a mechanical hinge or any other suitable coupling that enables the display portion to pivot about the support member.

As described in more detail below, and in one potential advantage of the present disclosure, using signals from the touchpad 120 the computing device 100 is configured to accurately process contacts on the touchpad from a user's finger, thumb, palm, knuckle(s), and/or a variety of other body parts having different shapes and larger surface areas, such as the side of their hand, another part of their hand, elbow, partial thumb, palm or partial palm, or other non-finger portion of their body. Advantageously, in some examples and as described further below, signals from the touchpad 120 are processed to provide precise and user-intended output, thereby accommodating and accurately processing touch inputs received from a wide variety of user body parts and their surfaces.

In some examples, the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's skin, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
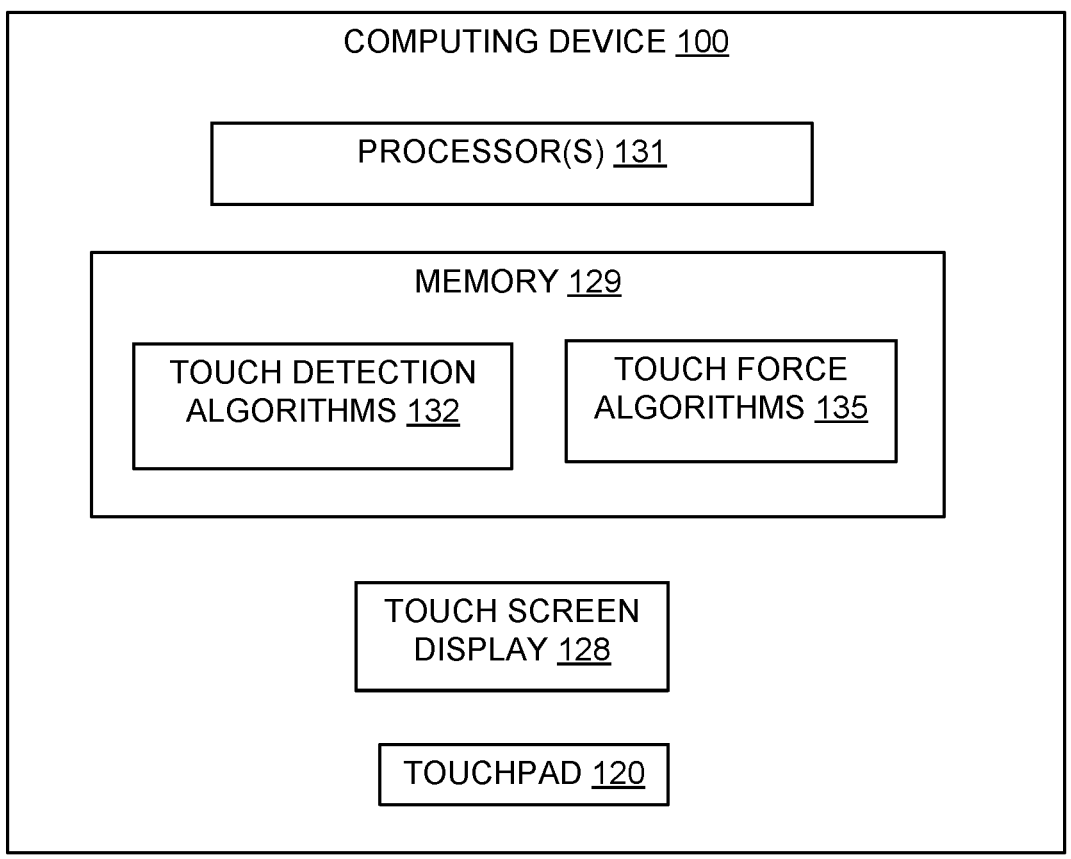
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 129 that stores instructions executable by a processor 131. For example and as described further below, the memory 129 stores instructions in the form of touch detection algorithms 132 executable by the processor 131 to perform touch detection on the touchpad 120 using signals received from the touchpad. Similarly, memory 129 stores instructions in the form of touch force algorithms 135 executable by the processor 131 to determine a force of a touch input on the touchpad 120. Additional details regarding memory 129, processor 131, and other components and subsystems of computing device 100 are described further below with reference to FIG. 21.

Figure 3:
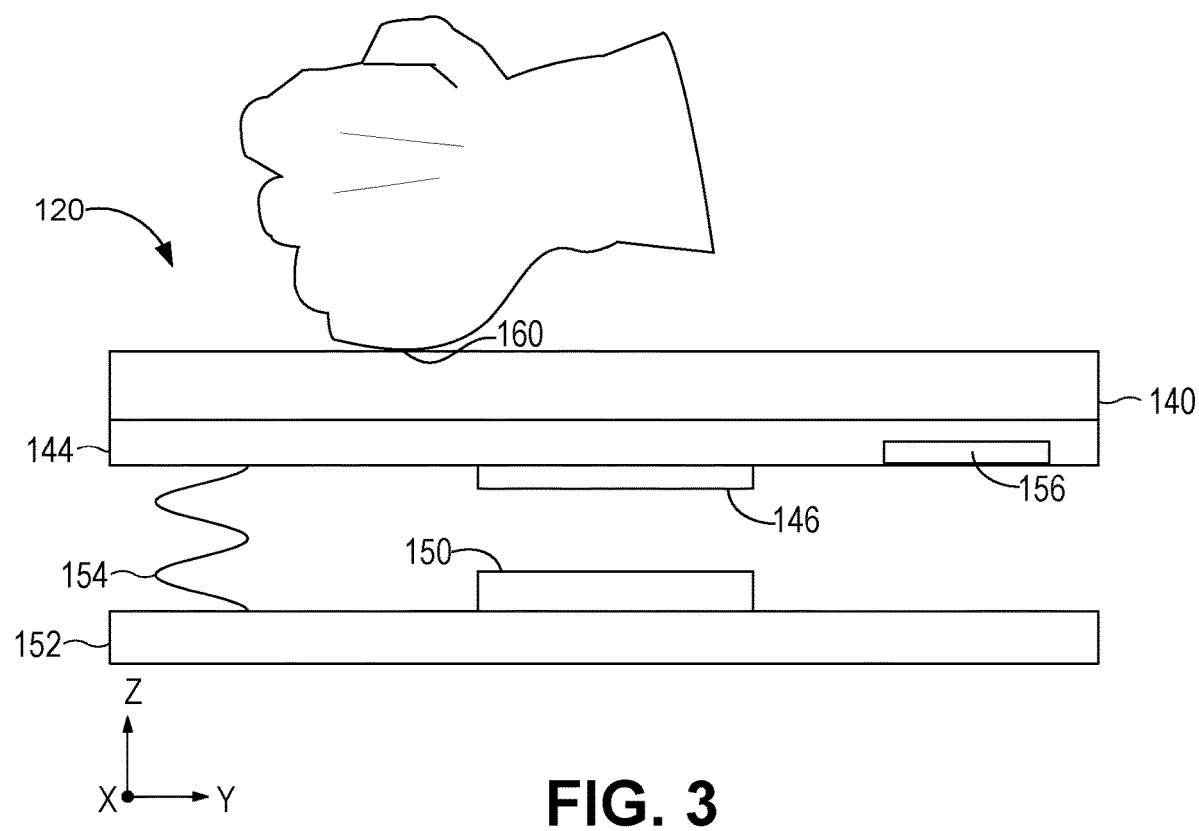
FIG. 3 shows a partial schematic cross section of the touchpad of FIG. 1.
Figure 4:
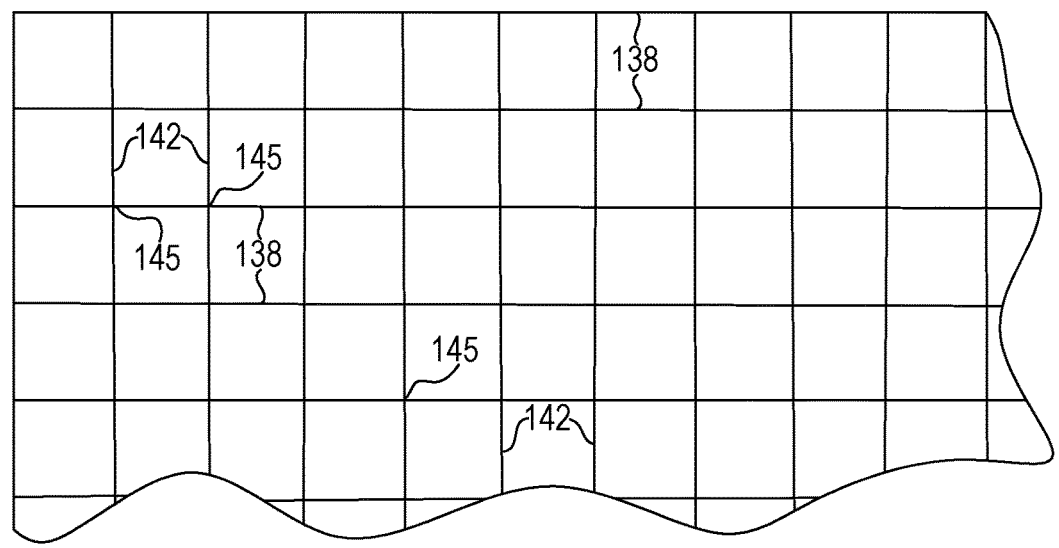
FIG. 4 shows a partial schematic view of capacitive horizontal and vertical antennas arranged in a grid in the touchpad.

With reference now to FIGS. 3 and 4, in one example touchpad 120 includes a cover glass layer 140 affixed to a printed circuit board (PCB) 144 by an adhesive layer (not shown). As described further below, a transparent array of capacitive touch antennas 138, 142 (sensors) in an upper layer of the PCB 144 is utilized to sense a plurality of touch contacts on the cover glass layer 140. In this example the PCB 144 also includes a PCB electrode 146 spaced from a base plate electrode 150 located on a base plate 152 and utilized for force sensing. In other examples, touchpads of the present disclosure can include two or more PCB electrodes and corresponding base plate electrodes.

As schematically indicated in FIG. 3, PCB 144 is spaced from and resiliently supported relative to the base plate 152. In this example, a spring 154 resiliently supports the PCB 144 to enable movement toward and away from the base plate 152. In other examples, a variety of other configurations can be utilized to resiliently support the PCB relative to the base plate 152. In this example the PCB 144 also includes an integrated circuit 156 configured to perform touch detection functionality via the touchpad 120 using the array of touch sensors (antennas).

In this example, touchpad 120 also functions as a capacitive force transducer that utilizes displacement as a proxy for force. In such a parallel plate capacitor model, the capacitance is equal to the area of the PCB electrode 146 divided by the distance between the PCB electrode and the base plate electrode 150. When a force applied to the cover glass layer 140 compresses the spring 154 and reduces this distance, the capacitance changes. In this model, the capacitance is directly proportional to the applied force, and a measured change in capacitance can be used to calculate the magnitude of the applied force F.

With reference again to FIG. 4, in the present example the capacitive touch antennas include horizontal antennas 138 and vertical antennas 142 arranged in a grid along X- and Y-axes. In some examples, the antennas are evenly spaced, such as by 4 mm. between antennas. In some examples, touch inputs are identified by sampling capacitance between a driving antenna and a sensing antenna. Signals are provided to the antennas at a different frequency and/or at a different time. A conductive object, such as a user's body part, draws current away from the driving electrodes when providing a touch input. As described further below, the touch input can be identified by detecting this current and locations of the touch input can be reconstructed based on determining which driving electrodes were being driven when the touch input occurred, and the frequency of the signal driving each driving electrode. Detecting this current also includes detecting the current flow into various sensing antennas that results from the increased capacitive coupling between the driving antennas and the sensing antennas caused by the touch input.

With reference again to FIG. 4, in this example touch contact on the touchpad 120 from a user's skin changes a capacitance and the signals passing through one or more junctions 145 between antennas 138, 142. Touch detection algorithms 132 utilize signals from junctions 145 to build touch heat maps that represent area(s) of contact on the touchpad. As described further below and in some examples, a touch heat map for each frame of data is used to determine a measured coordinate, such as the center of mass of the area(s) of contact, for each frame. In some examples the center of mass can be expressed in (x,y) coordinates in millimeters. In some examples, an X-Y coordinate system having its (0,0) coordinate corresponding to the top-most and left-most junction 145 in the antenna array is utilized.

As noted above, some users interact with the touchpad 120 using larger surface areas of their palm, side of their hand, knuckles or other body parts. Such larger area touch contacts can be irregularly shaped and contain multiple fragments. Accordingly, as noted above and in one potential advantage, configurations of the present disclosure calculate a center of mass of the touch contact(s) utilizing signals from all of the junctions 145 in the touchpad 120 that are generating a signal that is above a center of mass threshold CenterOfMassTh value. By utilizing this threshold, signals below the threshold from antennas having lower-level noise that is not resulting from a touch contact will be excluded.

The center of mass calculation is done separately for the X and Y axes using the equation:

$$\frac{\sum \text{Signal} * \text{Index}}{\sum \text{Signal}}$$

where the Index is an antenna index, such as antenna number 10. The center of mass calculation generates (x,y) coordinates of units of antennas. Because the distance between antennas is known, the (x,y) coordinates can be transformed into millimeters.

The signal at a junction 145 is the junction relative value, calculated using a calibration touch heat map that is generated when no touch contact is present on the touchpad 120 and includes calibration signals for each junction. Accordingly, the junction relative value is the current junction signal value divided by the calibration signal for that junction. The touch heat map can then be generated using these junction relative values.

In some examples the touch center of mass is calculated using antenna fractional units. The signal at each junction is multiplied by the corresponding antenna index, so that the resulting coordinate will be in antenna units, such as 4.5 at X-axis, 5.6 at Y-axis.

In some examples, touch detection algorithms 132 use connected component labeling (CCL) techniques during touch heat map scanning to identify touch blobs, which are also referred to herein as junction groupings. The CCL algorithms can use diagonal connections in addition to vertical and horizontal connections (8 connectivity). When the touchpad receives a touch contact, it can group the junctions registering contact on the touchpad into one or more junction groupings. For purposes of the present disclosure, a junction grouping is defined as two or more junctions adjacent to one another and registering contact on the touchpad. For example, where two adjacent junctions register contact, those junctions will form at least a portion of one junction grouping. Where two junctions registering contact are spaced from one another by more than the antenna spacing (such as 4 mm), and there are no intervening junctions registering contact that connect the two junctions, these two junctions will form at least portions of two different junction groupings.

Figure 5:
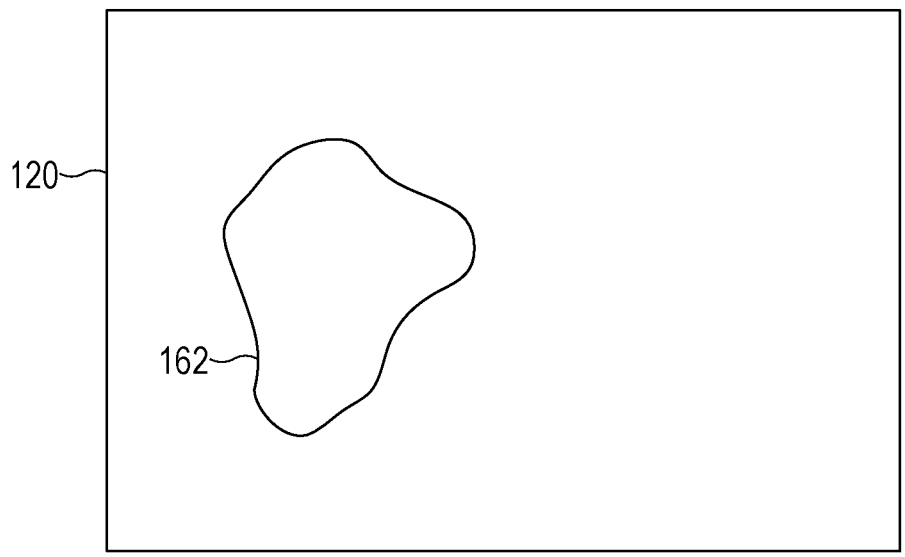
FIG. 5 shows an example of a touch map representing contacts on the touchpad according to examples of the present disclosure.
Figure 6:
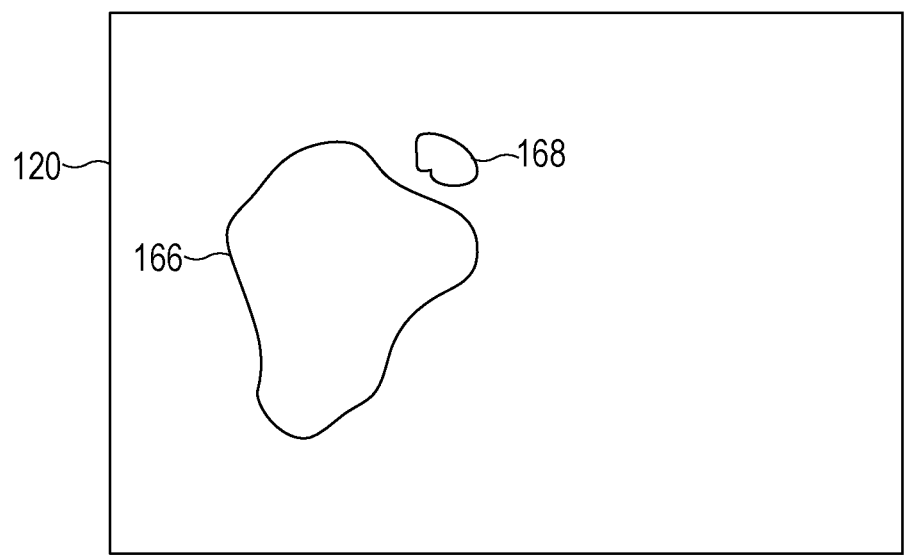
FIG. 6 shows an example of a touch map representing contacts on the touchpad grouped into two junction groupings according to examples of the present disclosure.

In one example and with reference to FIG. 5, touch detection algorithms 132 generate a touch map 162 that represents the plurality of contacts registered at corresponding junctions 145 that correspond to the side of the user's left palm 160 contacting the cover glass 140 of the touchpad 120. With referent now to FIG. 6, in another example a person may contact the trackpad with a side of her partial left hand. In this example, the junctions registering contact are grouped into a first junction grouping 166 and a second junction grouping 168.

During the CCL touch heat map scanning for each frame of data, the touch detection algorithms 132 calculate a touch center of mass as described above and a plurality of other touch characteristics that include:

1. Number of Hot Junctions.

The number of junctions that are above a hot junction threshold HotJuncThr value are counted. A hot junction is a junction that is determined to indicate a touch contact. In some examples, the HotJuncThr threshold value is higher than the center of mass threshold CenterOfMassTh value. In one example, the HotJuncThr threshold value is 6% and the center of mass threshold CenterOfMassTh value is 3%. In these examples, the threshold percentages represent the junction relative value as described above (e.g., the junction signal value divided by the calibration signal for that junction). If there is a touch contact at a junction, the current signal will be lower than the calibration signal because the touch contact takes current and the receiver antenna will receive less current. The stronger the contact the more current will be taken from the antenna. In some examples, the touch heat map can comprise a percentage of current that was taken by touch at each junction. In the present example, a hot junction is a junction that has a relative junction value above 6%. Additionally, by using a lower center of mass threshold (3% in this example), junctions that are not directly underlying the touch contact but are very close to the touch contact are also considered in calculating the center of mass. In other examples, a single threshold value can be used for both the hot junction threshold HotJuncThr and the center of mass threshold CenterOfMassTh.

2. Sum of Hot Junctions.

The algorithms calculate a sum of the relative values of junctions 145 that are above the hot junction threshold HotJuncThr.

3. Bounding Box.

The algorithms measure an area of the touch contact by generating a bounding box that contains all of the identified hot junctions. The algorithms determine the number of vertical and horizontal antennas that bound the touch area by determining the maximal and minimal X antennas and the maximal and minimal Y antennas of the touch area. For determining the bounding box, the algorithms utilize only junctions above a BoundBoxThr value. The output of the bounding box determination is reported by the number of antennas on the X and Y axes.

4. Touch Maximal Value.

The algorithms find the maximal value in the heatmap, which is the junction having the maximal value. The maximal value can be expressed as a percentage calculated by dividing the junction (signal) value by the value at the junction when there is no touch contact on the trackpad, such as that junction's value in the calibration touch heat map. In different examples, junction maximal values can be in the range of 20%-25% of the value at the junction when there is no touch contact on the trackpad.

5. Number of Junction Groupings (Touch Blobs).

The algorithms determine the number of junction groupings in the touch heat map.

6. Number of Significant Junction Groupings (Blobs).

The algorithm determines the number of significant junction groupings, where a significant junction grouping is defined as a junction grouping having a maximal value above a significant blob threshold value SignBlobThr. For each identified junction grouping the algorithms determine the maximal value at a maximal junction.

In order to prevent toggling of the number of significant junction groupings, the significant blob threshold SignBlobThr is calculated with hysteresis using a significant blob hysteresis value SignBlobHyst. The hysteresis value for the significant blob threshold is subtracted from SignBlobThr if the number of significant blobs at this frame of data (n) is smaller than the number of significant blogs at the previous frame of data (n−1).

In one example, the significant blob threshold value SignBlobThr is 10%. In the next frame of data, because of noise in the system, the number of significant blobs is smaller than the number of significant blogs at the previous frame. Accordingly, to prevent toggling of the number of significant junction groupings due to this noise, the significant blob threshold value SignBlobThr is reduced by a predetermined amount, such as 2%, to a lower value, for example, 8%. Advantageously, this reduces or prevents toggling between frames.

7. Maximal Value of the Minimal Significant Junction Grouping (Blob).

The algorithms find the maximal values of each one of the significant junction groupings and then selects the minimal value among those maximal values.

The number of significant blobs and maximal value of minimal significant blob can be calculated using the following pseudocode:

```
[NumOfSignBlobs, SignBlobsMaxValue
   Aray]=CountBlobs(SignBlobThr);
MinSignBlob=min(SignBlobsMaxValueAray);
if NumOfSignBlobs<NumOfSignBlobsPrevFrame
   [NumOfSignBlobs, SignBlobsMaxValue
      Aray]=CountBlobs(SignBlobThr−SignBlobHyst);
   MinSignBlob=min(SignBlobsMaxValueAray);
   if NumOfSignBlobs>NumOfSignBlobsPrevFrame
      NumOfSignBlobs=NumOfSignBlobsPrevFrame;
      SignBlobsMaxValueAraySorted=sort(SignBlob-
         sMaxValueAray, 'descend');
      MinSignBlob=SignBlobsMaxValueAraySorted(Nu-
         mOfSignBlobs);
   end
end
```

As described in more detail below, using one or more of the above-identified characteristics and the center of mass coordinate, the touch detection algorithms 132 track the object's contact with the touchpad 120 and corresponding coordinates, and process such coordinates to detect coordinate jumps, selectively perform jitter restriction when warranted, and smooth the movement of the center of mass coordinates. When coordinate jumps are detected, the jumps are separated from the legitimate object movement by applying logic to object characteristics. As described further below, when a coordinate jump is detected, the algorithms refrain from changing the coordinate, save the jump offset, and remove the jump offset from all of the subsequent coordinates until the track is closed.

At each frame of data, a measured track object is valid only if the touch maximal value is above a finger up threshold FingerUpThr value. Values below the finger up threshold FingerUpThr value indicate that the user has removed her touch contact from the touchpad 120. If the measured touch object is valid, it is matched to the active track or a new track is opened if there is no active track. If there is an active track and there is no valid measured touch object, then the algorithms close the active track and a "finger up" indication is reported. In the present examples, a "track" comprises a sequence of final coordinates determined for the object over a number of frames of data. As described further below, the final coordinates are the output of the touch detection algorithms after selectively processing the measured center of mass coordinate with the jump detection, jitter restriction, and smoothing algorithms. When a user lifts her body part from contact with the trackpad, the frames of data that follow will not have any contacts with a touch maximal value above the finger up threshold FingerUpThr value. When the number of such frames exceeds a close track threshold CloseTrackTh value, such as 10, the algorithms close the current track.

After matching a measured touch object to a track, or starting a new track, the algorithms can run a jumps detector, jitter restrictor and track smoothing on the measured touch object center of mass coordinate. In some examples, the algorithms begin to report final coordinates to the operating system only after two adjacent frames of data with valid touch objects are identified. In this manner, the algorithms reduce the possibility of reporting an inadvertent contact or false tap on the touchpad 120.

Figure 7:
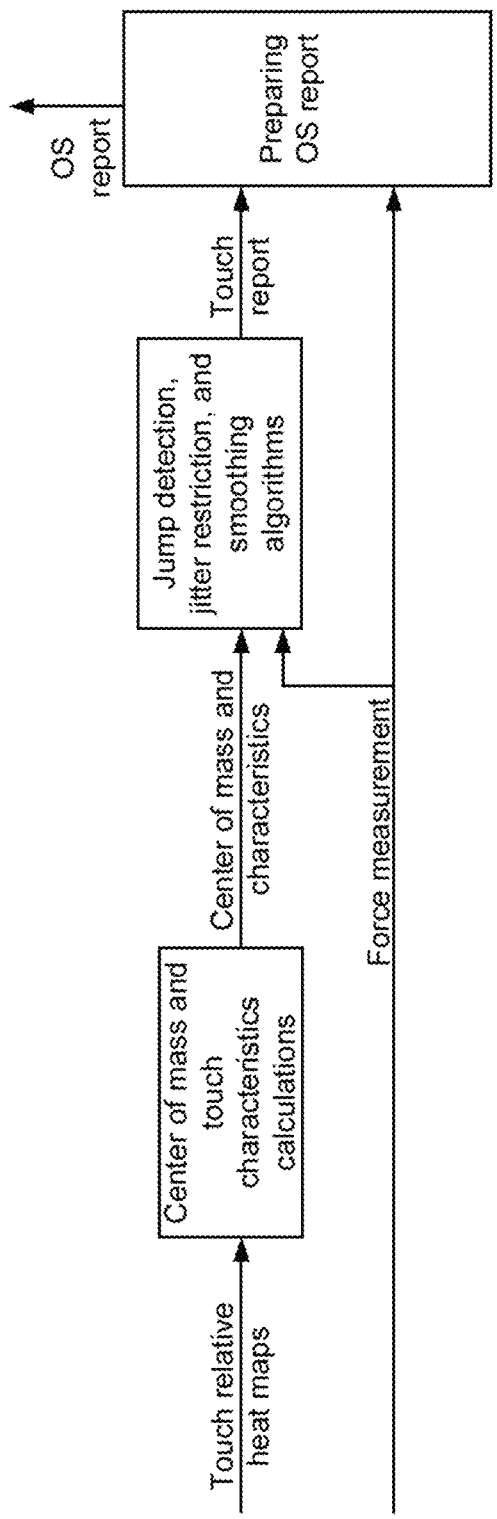
FIG. 7 shows a block diagram of the flow of touch and force processing performed on a valid touch object according to examples of the present disclosure.
Figure 8:
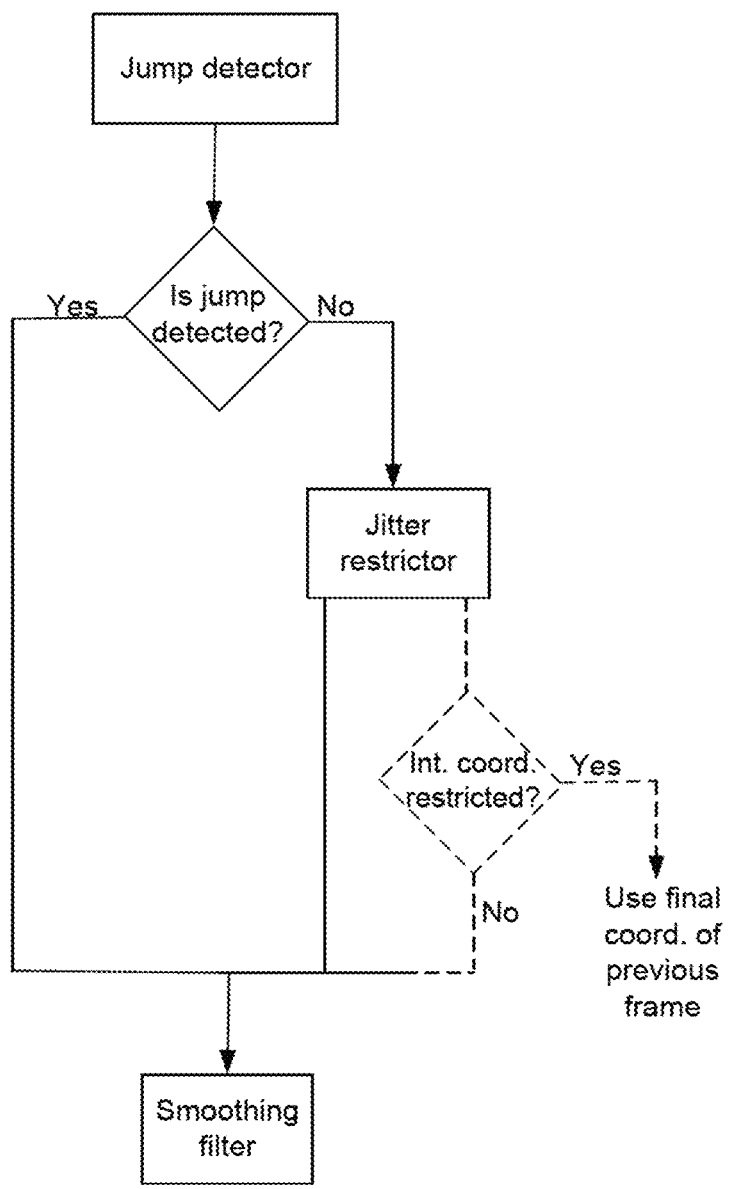
FIG. 8 shows a block diagram of the flow of processing performed by the jump detector, jitter restrictor, and smoothing filter according to examples of the present disclosure.

As described in more detail below, FIG. 7 shows a block diagram of the flow of processing performed on a valid touch object. FIG. 8 shows a block diagram of the flow of processing performed by the jump detector, jitter restrictor, and smoothing filter. For purposes of the present disclosure, the following definitions of different coordinates may be utilized:

A measured coordinate is the input coordinate to the jump detection algorithms. A measured coordinate is a center of mass coordinate that is calculated by the center of mass algorithms described above.

An intermediate coordinate is the output coordinate as determined by the jumps detection block. In some examples the intermediate coordinate is an input coordinate to the jitter restrictor block and then to the track smoothing block.

A final coordinate is the output coordinate after the track smoothing block, and is reported to the operating system.

One example of pseudocode for algorithms corresponding to the block diagram of FIG. 8 is:

if Measured.MaxValue>FingerUpThr
  BigContactCheck(Measured);
  JitterRestrictorRangeSet(Measured);
  JumpsDetector(Measured);
  if JumpDetected
    Intermediate(n)=Intermediate(n-1);
  else
    Intermediate(n)=Measured (n)-Offset;
    Intermediate(n)=JitterRestrictor(Intermediate(n));
  end
  Final (n)=SmoothingFilter(Intermediate(n));
  if TrackCounter>1
    Report (Final);
  end
else
  Close the track; & Zero all the track variables and history
  FingerUP;
end A description of the touch detection algorithms 132 for performing jump detection will now be provided. As noted above, in many cases coordinate jumps are created in reported coordinates when a user is either initiating contact with the touchpad 120 or removing contact with the touchpad. For example, where a user is beginning to contact or is removing a larger contacting area, the skin of the contact area can make contact with the touchpad in a gradual manner, with changes in appearance detected in an initial number of frames. In one example, a user may initiate contact by resting multiple fingers on the touchpad and then moving the fingers, causing the center of mass coordinate to jump significantly over the corresponding frames of data. As described further below, touch detection algorithms 132 can identify that such coordinates correspond to a jump, as opposed to a legitimate, intended movement by the user, such as a fast movement across the touchpad. In response, the algorithms refrain from reporting the jump coordinate and process the coordinate to create a smoother synthetic motion.

To identify coordinate jumps and adjust the measured coordinate appropriately, the touch detection algorithms 132 utilize heuristics to compare characteristics of an object's touch contact from a current frame of data to characteristics of the object's touch contact in one or more previous frames of data. In some examples, where at least one of the comparisons produces a large difference, a coordinate jump is identified.

As described in more detail below, jump detection algorithms evaluate a number of heuristics on the measured touch object and the characteristics of the contact with the touchpad. If one of the heuristics is true, then a coordinate jump is detected. If a coordinate jump is detected, then the immediately prior frame's intermediate coordinate value is assigned to the current frame intermediate coordinate, and a jump flag is activated (e.g., set to a value of 1). Advantageously and in this manner, the current frame intermediate coordinate (which is identified as a jump) is not reported to the operating system. Instead, the immediately prior frame's intermediate coordinate is reported (after smoothing to generate a smoothed immediately prior frame intermediate coordinate value), so that the operating system calculates no change in the relative location of the final coordinate of the current frame.

If the jump detection algorithms do not detect a coordinate jump and the jump flag is not activated (set to 0, meaning that a jump was not detected at the previous frame), the intermediate coordinate of the current frame is assigned the value of the measured coordinate of the current frame minus any offset and the algorithm continues to the jitter restrictor. When a track is initiated the offset is zero. As described further below, if during the tracking coordinate jumps are detected and/or jitter restriction is performed, then a jump offset or restriction offset is saved and is subtracted from all subsequent coordinates calculated in subsequent frames. One example of corresponding pseudocode for these techniques is:

Intermediate.X(n)=Measured.X(n)-Offset.X
Intermediate.Y(n)=Measured.Y(n)-Offset.Y
JitterRestrictor(Intermediate)

If the jump detection algorithms do not detect a coordinate jump, and the jump flag is 1, meaning that the current coordinate is a first coordinate without a jump after coordinates with a jump, and the prior jump was not detected during the jitter restriction processing (e.g., the previous coordinates were not already restricted because of jitter restriction conditions), then an offset on both X- and Y-axes is measured (with respect to the final coordinate of the prior frame of data), and the current (new) coordinate is reported to the operating system after processing by the jitter restriction algorithms and smoothing algorithms described below. In these examples where a coordinate jump is not detected, the intermediate coordinate of the current frame is set to the measured coordinate minus the offset. Additionally, for all subsequent intermediate coordinates determined in subsequent frames of data where a coordinate jump is not detected, these intermediate coordinates are also set to that frame's measured coordinate minus the offset. In this manner, the prior adjustment made for the previously detected jump is removed. If the prior coordinate jump was detected during the jitter restriction processing (e.g., the previous coordinates already were restricted because of jitter restriction conditions), then the offset is calculated after the jitter restriction process is completed as described below.

The operating system receives and processes the final coordinates that are reported after processing by the algorithms described herein. In some examples, the final coordinates are reported as physical x,y locations, and the operating system calculates the change dx, dy in the locations from the prior frame coordinates and utilizes these values to adjust the location of a displayed object, such as a cursor.

Figure 9:
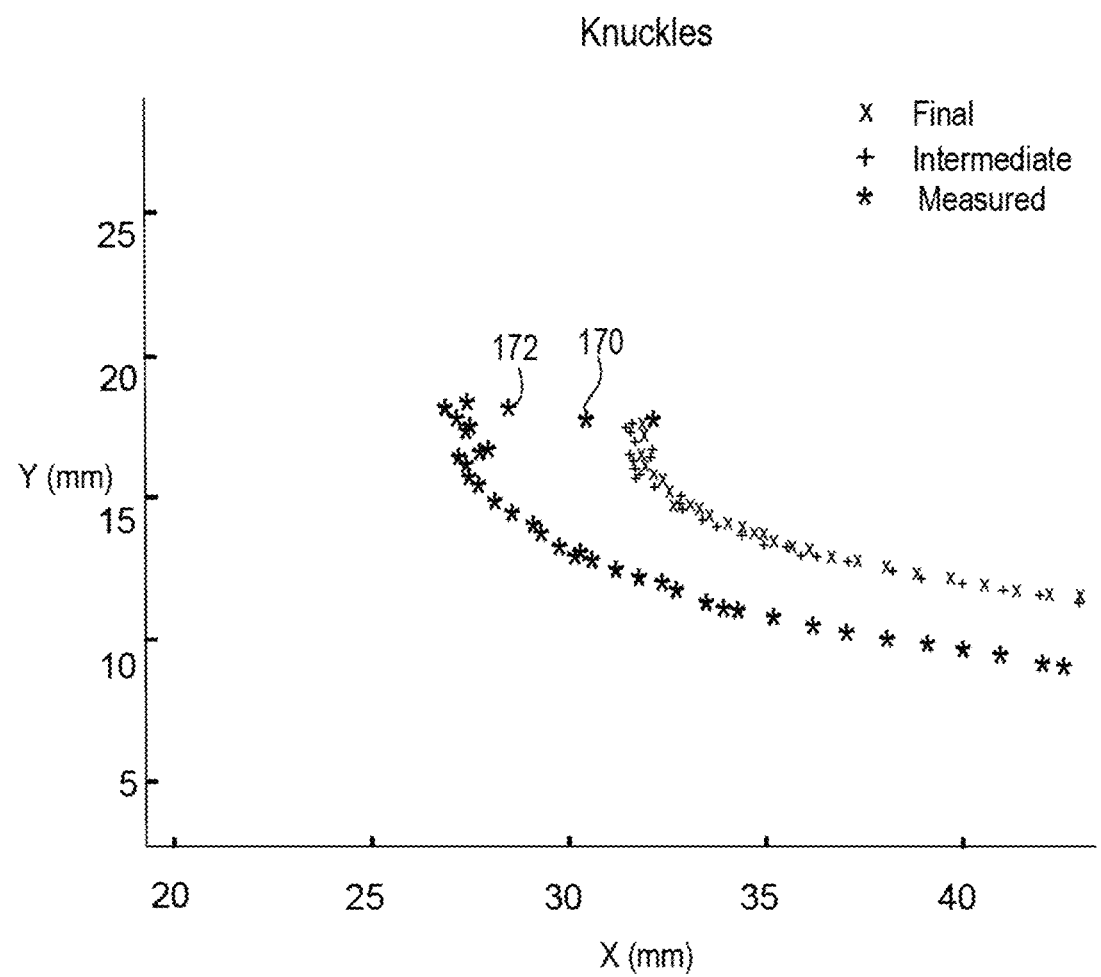
FIG. 9 shows an example of jumps detected by the jump detection algorithms at an initiation (entrance) of a touch contact by multiple knuckles of a user's hand.

FIG. 9 illustrates an example of coordinate jumps detected by the jump detection algorithms at an initiation (entrance) of a touch contact by multiple knuckles of a user's hand. In this example, the jump detection algorithms determine that the measured touch contact at frame 2 (170) is a jump because of a large change in the relative number of hot junctions identified in this frame (e.g., the number exceeds a threshold as described further below). The jump detection algorithms determine that the measured touch contact at frame 3 (172) is a jump because of a large change in the number of significant junction groupings (blobs) identified in this frame (e.g., the number exceeds a threshold as described further below). In this example, the offset is the distance between the first measured coordinate of a frame (n) without a detected jump after the coordinates with detected jumps, and the final coordinate of the prior frame (n−1). As described further below, configurations of the present disclosure transform the measured touch contacts (indicated by the * symbol) into intermediate touch contacts (indicated by the + symbol) and final touch contacts (indicated by the X symbol).

Figure 10:
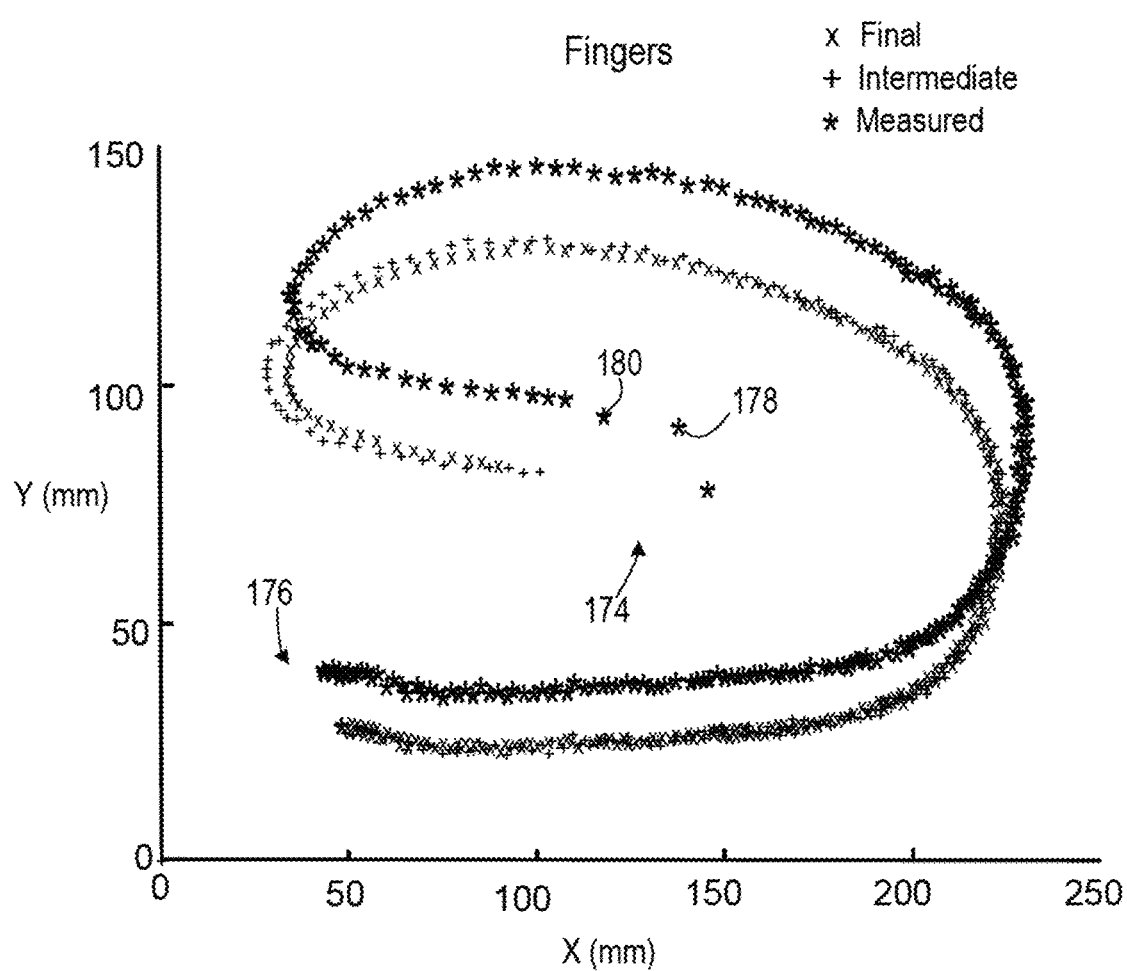
FIG. 10 shows another example of jumps detected by the jump detection algorithms at the initiation (touch on) and release (touch off) of a touch contact by multiple fingers of a user's hand.

FIG. 10 illustrates another example of coordinate jumps detected by the jump detection algorithms at the initiation (touch on) 174 and release (touch off) 176 of a touch contact by multiple fingers of a user's hand. In this example, the jump detection algorithms determine that the measured touch contact at frames 2 (178) and 3 (180) are jumps.

One example of pseudocode for performing jump detection is:

```
JumpDedected = CheckJumpHeuristics(Measured) ;
if first coordinate at track
   TrackStartFlag=1;
else
   if JumpDetected
      Intermediate.X(n) = Intermediate.X(n-1) ;
      Intermediate.Y(n) = Intermediate.Y(n-1) ;
      JumpFlag=1;
   else
      if JumpFlag AND !RestrictionFlag
         if TrackStartFlag
            OffsetX = Measured.X(n) − Intermediate.X(n-1) ;
            OffsetY = Measured.Y(n) − Intermediate.Y(n-1) ;
         else
            OffsetX = Measured.X(n-1) − Intermediate.X(n-1) ;
            OffsetY = Measured.Y(n-1) − Intermediate.Y(n-1) ;
         end
      end
      JumpFlag=0;
      TrackStart Flag=0 ;
      Intermediate.X(n) = Measured.X(n) − OffsetX;
      Intermediate.Y(n) = Measured.Y(n) − OffsetY;
      if Intermediate < 0 OR Intermediate > SensorBorders
         Close the track and report finger up;
      end
      JitterRestrictor(Intermediate) ;
   end
end
```

As noted above, the touch detection algorithms 132 utilize a plurality of heuristics to compare characteristics of an object's touch contact from a current frame of data to characteristics of the object's touch contact in one or more previous frames of data. In some examples, if one of the heuristics is true, then a coordinate jump is detected. In other examples, if two or more of the heuristics are true, then a coordinate jump is detected. The heuristics include:

1. Force is below a minimal force threshold value MinimalForceThr.

In some examples, for each frame of data an initial minimal force heuristic is evaluated to determine if the touch contact is a valid touch. In these examples, a measured touch contact is valid only if the touch maximal value is above a finger up threshold FingerUpThr value. Values below the finger up threshold FingerUpThr value indicate that the user has removed her touch contact from the touchpad 120. If the measured touch object is valid, it is matched to the active track or a new track is opened if there is no active track. If there is an active track and there is no valid measured touch object, then the algorithms close the active track and a "finger up" indication is reported.

Where the touch detection algorithms 132 determine that the touch maximal value is above the finger up threshold FingerUpThr value (e.g., the measured touch contact is valid), the algorithms next determine whether the touch contact is a large contact track. If the touch contact is not a large contact track (such as a smaller contact area corresponding to a single fingertip), then the algorithms refrain from evaluating the heuristics 2-10 described below (which are tailored to detect coordinate jumps from large contact tracks). In some examples and as described further below, a measured track is designated as a large contact track if either (1) the number of hot junctions at the measured touch object is above a big object hot junction threshold value BigObjectHotJuncThr, or (2) a number of hot junctions in the bounding box on one or both of the X- and Y-axes is above a big object bounding box threshold value BigObjectBoundBoxThr. The BigObjectHotJuncThr is used to determine if the object is single finger object or bigger object (bigger than single finger). After a track is designated a large contact track, in evaluating subsequent frames of data the track remains a large contact track until the track is closed.

2. Difference of number of hot junctions at current and previous frames is above HotJuncDiffThr.

Where the difference between the number of hot junctions in the current frame (n) of data and the number of hot junctions in the previous frame (n−1) of data is above a hot junction difference threshold HotJuncDiffThr, a coordinate jump is detected.

3. Difference of number of hot junctions at current (n) and (n−2) frames is above HotJuncDiffThr_2.

Where the difference between the number of hot junctions in the current frame (n) of data and the number of hot junctions in the second previous frame (n−2) of data is above a hot junction difference threshold HotJuncDiffThr_2, a coordinate jump is detected. One example of pseudocode for this heuristic is:

abs(Measured.NumOfHotJunc(n)−Measured.NumOfHotJunc(n−2))>HotJuncDiffThr_2

4. Relative value of number of hot junctions between current and previous frames is below HotJuncRelThr or above 1/HotJuncRelThr and number of hot junctions difference is above 1.

Where the relative value of the number of hot junctions between the current frame and the previous frame is (1) either (a) below a first hot junction relative threshold value HotJuncRelThr, or (b) above the inverse of the first hot junction relative threshold value 1/HotJuncRelThr, and (2) the difference in the number of hot junctions between the current and previous frames is above 1, a coordinate jump is detected. The relative value of the number of hot junctions is the number of hot junctions in the current frame divided by the number of hot junctions in the previous frame. One example of pseudocode for this heuristic is:

(Measured.NumOfHotJunc(n)/Measured.NumOfHotJunc(n−1)<HotJuncRelThr
OR
Measured.NumOfHotJunc(n)/Measured.NumOfHotJunc(n−1)>1/HotJuncRelThr)
AND
abs(Measured.NumOfHotJunc(n)−Measured.NumOfHotJunc(n−1))>1

5. Relative value of number of hot junctions between current and n−2 previous frames is below HotJuncRelThr_2 or above 1/HotJuncRelThr_2 and number of hot junctions difference is above 1.

Where the relative value of the number of hot junctions between the current (n) frame and the second previous (n−2) frame is (1) either (a) below a second hot junction relative threshold value HotJuncRelThr_2, or (b) above the inverse of the second hot junction relative threshold value 1/HotJuncRelThr_2, and (2) the difference in the number of hot junctions between the current and second previous frames is above 1, a coordinate jump is detected. For this heuristic, the relative value of the number of hot junctions is the number of hot junctions in the current (n) frame divided by the number of hot junctions in the (n−2) previous frame. One example of pseudocode for this heuristic is:

(Measured.NumOfHotJunc(n)/Measured.NumOfHotJunc(n−2)<HotJuncRelThr_2
OR
Measured.NumOfHotJunc(n)/Measured.NumOfHotJunc(n−2)>1/HotJuncRelThr_2) AND
abs(Measured.NumOfHotJunc(n)−Measured.NumOfHotJunc(n−2))>1

6. Difference of hot junctions signal sum between the current and previous frames divided by the minimal value of the frames is above HotJuncSumThr.

For this heuristic, the signal values at all of the hot junctions are summed for the current frame and for the previous frame. The difference between the sum of signals in the current frame and the sum of signals in the previous frame is calculated. To normalize this value, this difference is divided by the smallest signal value of all of the hot junctions in the current and previous frames. If this normalized value is above a hot junction sum threshold value HotJuncSumThr, then a coordinate jump is detected. One example of pseudocode for this heuristic is:

abs(Measured.HotJuncSum(n)−Measured.HotJuncSum(n−1))/min(Measured.HotJuncSum(n), Measured.HotJuncSum(n−1))>HotJuncSumThr 7. Difference at bounding box on at least one of the axes between the current and previous frames is above BoundBoxDiffThr.

As noted above, the algorithms generate an X-axis bounding box and a Y-axis bounding box that each contain all of the identified hot junctions above a BoundBoxThr value for that axis. Where the bounding box for at least one of the X-axis and Y-axis changes between the current and previous frames, and the difference is above a bounding box difference threshold value BoundBoxDiffThr, a coordinate jump is detected. One example of pseudocode for this heuristic is:

abs(Measured.BoundBoxX(n)−Measured.BoundBoxX(n−1))>BoundingBoxDiffThr
OR
abs(Measured.BoundBoxY(n)−Measured.BoundBoxY(n−1))>BoundingBoxDiffThr 8. Relative value of bounding box on at least one of the axes between current and previous frames is below BoundBoxRelThr or above 1/BoundBoxRelThr and bounding box difference on at least one of the axes is above 1.

As noted above, the algorithms generate an X-axis bounding box and a Y-axis bounding box that each contain all of the identified hot junctions above a BoundBoxThr value for that axis. Where the relative value of the bounding box for at least one of the X-axis and Y-axis is below a bounding box relative threshold value BoundBoxRelThr or above 1/BoundBoxRelThr, and the bounding box difference on at least one of the axes is above 1, a coordinate jump is detected. One example of pseudocode for this heuristic is:

((Measured.BoundBoxX(n)/Measured.BoundBoxX(n−1)<BoundBoxRelThr OR
Measured.BoundBoxX(n)/Measured.BoundBoxX(n−1)>1/BoundBoxRelThr) AND
abs(Measured.BoundBoxX(n)−Measured.BoundBoxX(n−1))>1) OR
((Measured.BoundBoxY(n)/Measured.BoundBoxY(n−1)<BoundBoxRelThr OR
Measured.BoundBoxY(n)/Measured.BoundBoxY(n−1)>1/BoundBoxRelThr) AND
abs(Measured.BoundBoxY(n)−Measured.BoundBoxY(n−1))>1)

9. There is a change in the number of significant blobs (significant junction groupings) compared to the previous frame and the change is different than the number of blobs change.

As noted above, a significant junction grouping is defined as a junction grouping having a maximal value above a significant blob threshold value SignBlobThr. For this heuristic, where the number of significant junction groupings in the current frame changes from the number of significant junction groupings in the previous frame by a value SignBlobsDiff, and this value is different from a BlobsDiff value defined as the difference in the number of junction groupings between the current and previous frames, a coordinate jump is detected. One example of pseudocode for this heuristic is:
   SignBlobsDiff=abs(Measured.NumOfSignBlobs(n)−
      Measured.NumOfSignBlobs(n−1));
   BlobsDiff=abs(Measured.NumOfBlobs(n)−Measured.NumOfBlobs(n−1));
   (SignBlobsDiff>0) AND (SignBlobsDiff!=BlobsDiff)
   10. Difference at minimal significant blob value between the current and previous frames is above MinSignBlobDiffThr and number of blobs hadn't changed compared to the previous frame.

Where the difference between the minimal significant junction grouping (blob) value in the current frame and the previous frame is above a minimal significant blob difference threshold value MinSignBlobDiffThr, and the number of junction groupings (blobs) did not change between these frames, a coordinate jump is detected. One example of pseudocode for this heuristic is:
   abs(Measured.MinSignBlob(n)−Measured.MinSignBlob
      (n−1))>MinSignblobDiffThr AND
   BlobsDiff==0

In some examples, the initial minimal force heuristic is satisfied to establish the touch contact as a valid touch, and none of the subsequent heuristics are satisfied. In these examples, where none of these other comparisons of the characteristics satisfies their corresponding threshold, the touch detection algorithms determine that a coordinate jump is not detected between the current frame of data and the immediately prior frame of data. In this case and as described further below, based at least on determining that the coordinate jump is not detected, jitter restriction is performed on the current frame intermediate coordinate value minus an offset to generate a jitter restricted current frame intermediate coordinate value.

Jitter restriction is performed by jitter restrictor algorithms of the touch detection algorithms 132. Advantageously and as described further below, the jitter restrictor algorithms operate to effectively restrict actual jitter while allowing (not restricting) actual user-intended movement, such as slow and/or gentle movement on the touchpad 120. Advantageously, the jitter restrictor strength is tuned according to the object size contacting the touchpad 120, and whether the detected object is single or multi-fragmented. Additionally and in another potential advantage described further below, the jitter restrictor strength is enhanced while force increase (click on) or force decrease (click off) on the touchpad is detected to reduce or prevent coordinate drift.

In some examples, the jitter restrictor algorithms perform jitter restrictor range setting and execute a jitter restrictor state machine. A jitter restriction range can be defined as a radius or distance from a reference coordinate of a previous frame, which is selected by the algorithms as described further below. As described further blow, where a current coordinate is within a jitter restrictor range, the prior coordinate of the prior frame of data is reported, and the current coordinate is "restricted."

In some examples the jitter restrictor range is determined based at least in part on the track size. Additionally or alternatively, in some examples the jitter restrictor range is determined based on force events.

As noted above, at each frame of data characteristics of the touch object are determined. In some examples the characteristics are used to selectively update the track size at each frame. In some examples the track size can only be increased in subsequent frames and cannot be decreased.

Figure 11:
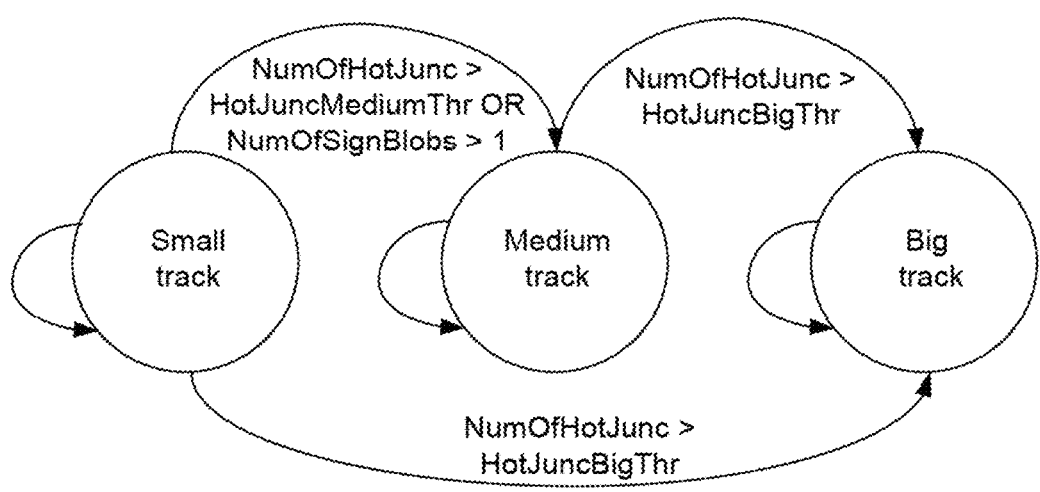
FIG. 11 schematically illustrates a track size state machine according to examples of the present disclosure.

FIG. 11 schematically illustrates one example of a track size state machine. At a given frame of data, if the number of hot junctions at the measured object is above HotJuncMediumThr or the number of significant junction groupings (blobs) is greater than 1, then the track becomes a medium size track. Additionally, if the number of hot junctions at the measured object is above the HotJuncBigThr, then the track becomes a big size track. The jitter restrictor range is determined based on the track size: where the track is a small track the jitter restrictor range is set to JitRestSmallThr; where the track is a medium track the jitter restrictor range is set to JitRestMediumThr; where the track is a big track the jitter restrictor range is set to JitRestBigThr. JitRestSmallThr is smaller than JitRestMediumThr, and JitRestMediumThr is smaller than JitRestBigThr.

As noted above, undesirable coordinate drift can occur when a user is applying force to or removing force from the touchpad 120, such as when pressing to select or releasing contact with the touchpad. When the area of contact on the touchpad is larger, such as with a user's palm, partial hand, multiple knuckles, etc., the pressure exerted on the touchpad is dispersed and not uniform, sometimes causing detection of multiple fragments of contact, with some fragments corresponding to greater force than other fragments. Further, the fragment shapes can quickly change as the user applies or releases force on the touchpad 120.

As described further below, a force event can be defined as a touch force that exceeds a touch force threshold, such as a Click On event, or falls below the threshold, such as a Click Off event. A force event can be calculated as the difference between the absolute values of a current frame force and the previous frame force. In some examples, a gradient of force change between frames can be utilized to determine that a force event has occurred.

In some events, when a force event is determined, such as a press or release event, the jitter restrictor range is increased for a predetermined number of subsequent frames of data. In this manner, during an initial period after a force event when the center of mass coordinate is more likely to drift, increasing the jitter restrictor range provides a more stable final coordinate. In some examples the center of mass drift after a press event (increasing force event) is smaller than the center of mass drift after a release event (decreasing force event). Accordingly, the magnitude of jitter restrictor range increase after a press event is less than the magnitude of jitter restrictor range increase after a release event. Advantageously, by utilizing a smaller jitter restrictor range during a press event, undesirable excessive restriction during a drag and drop input sequence is avoided.

Figure 12:
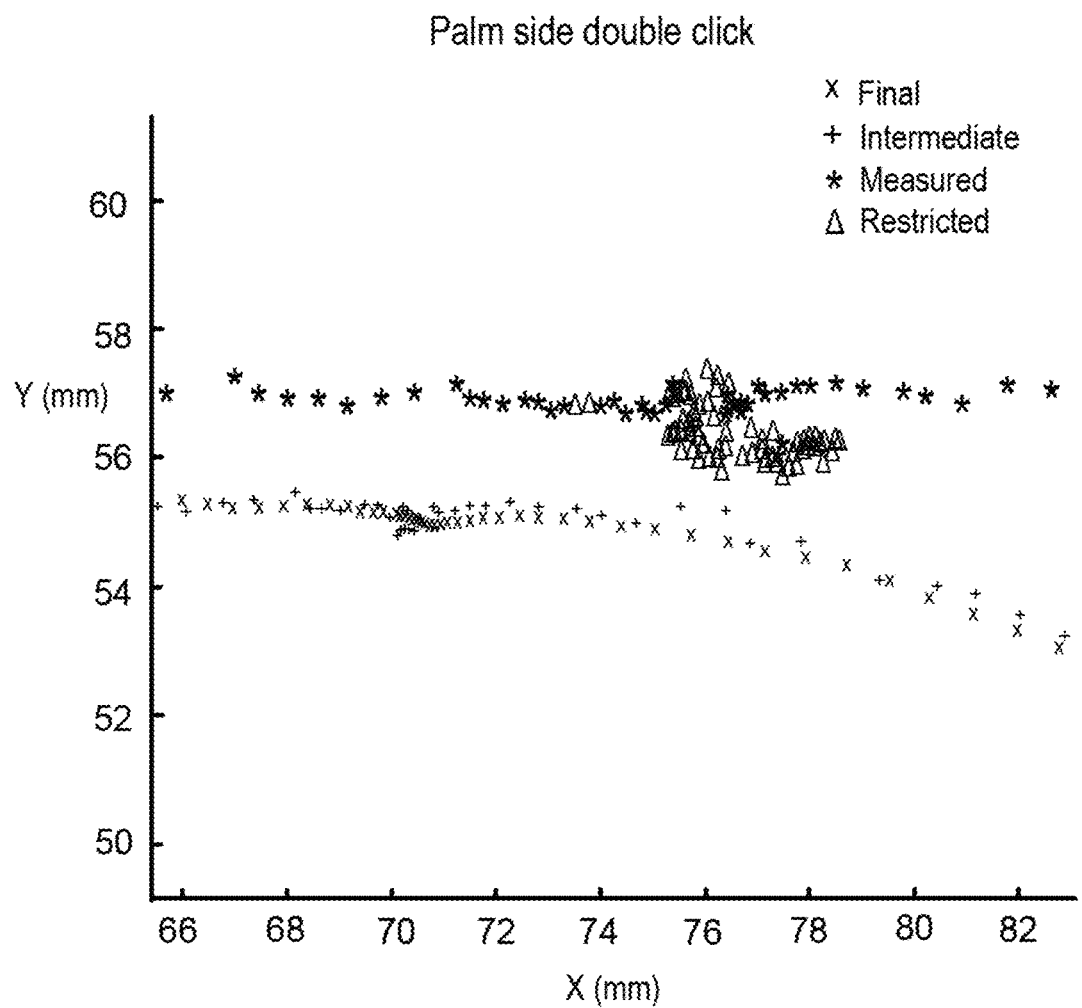
FIG. 12 shows an example of center of mass drift during a double click input by the side of a user's palm.

FIG. 12 illustrates an example of the center of mass drift during a double click input by the side of a user's palm. The points indicated by the A symbol are the measured points which were restricted by the jitter restrictor and are an example of coordinate instability. The points indicated by the X symbol are the final coordinates after restriction and smoothing. As noted above, a "restricted" coordinate is a coordinate that is not reported as a final coordinate, and instead a previous coordinate is reported, as if no movement was detected.

Figure 13:
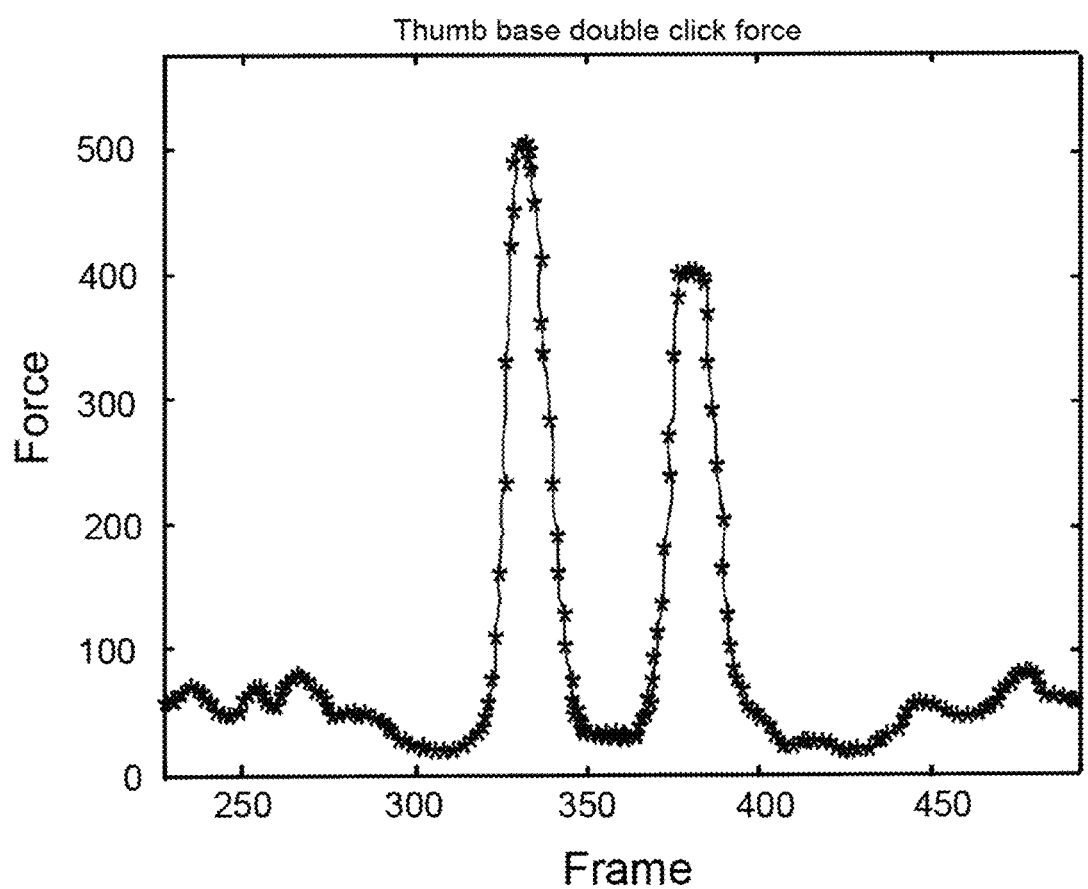
FIG. 13 shows an example of the forces exerted on the touchpad by the base of a user's thumb during a double click input.

FIG. 13 shows an example of the forces exerted on the touchpad by the base of a user's thumb during a double click input.

Figure 14:
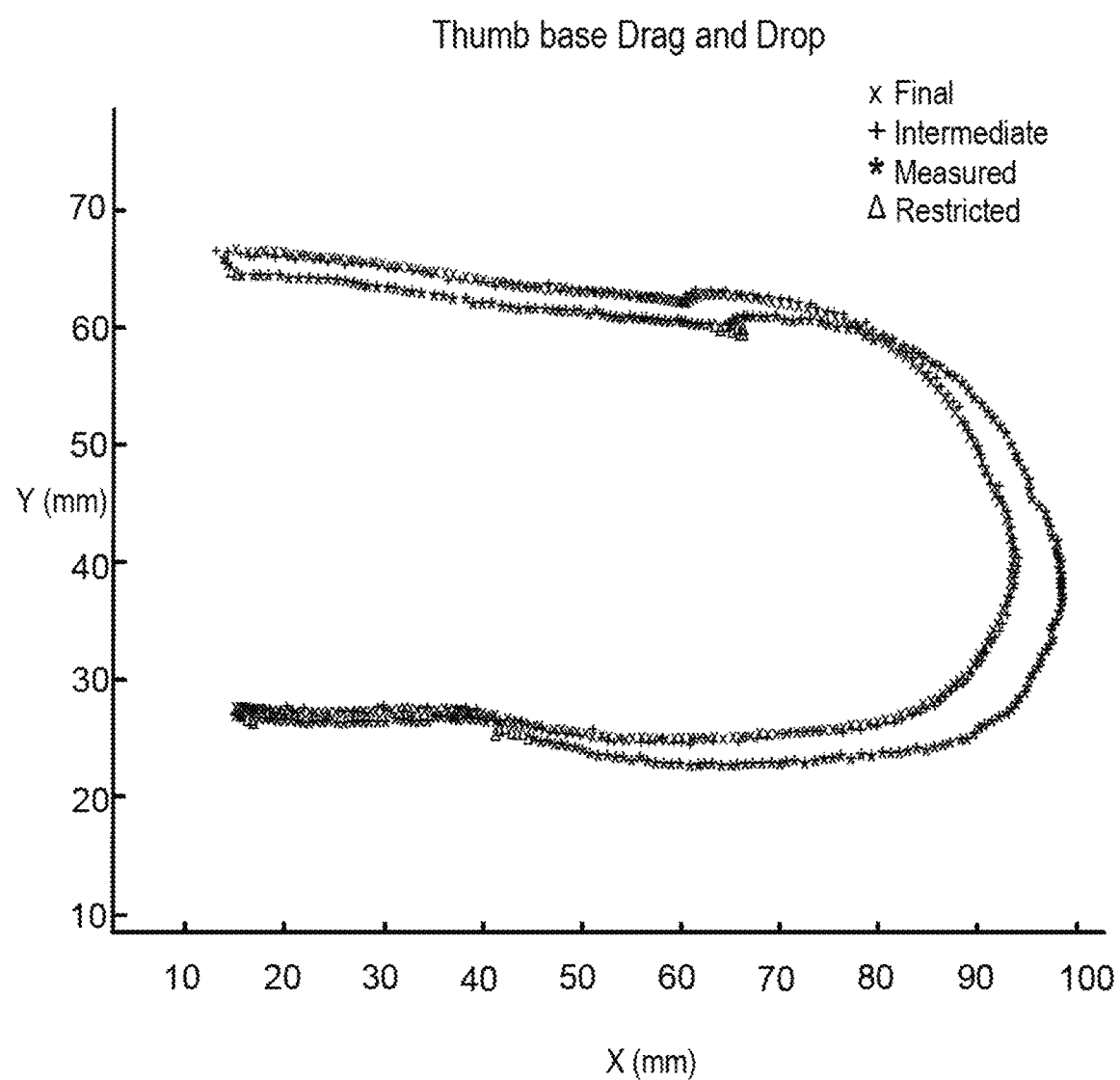
FIG. 14 shows a drag and drop input sequence which was performed by the base of a user's thumb.

FIG. 14 shows a drag and drop input sequence which was performed by the base of a user's thumb.

Figure 15:
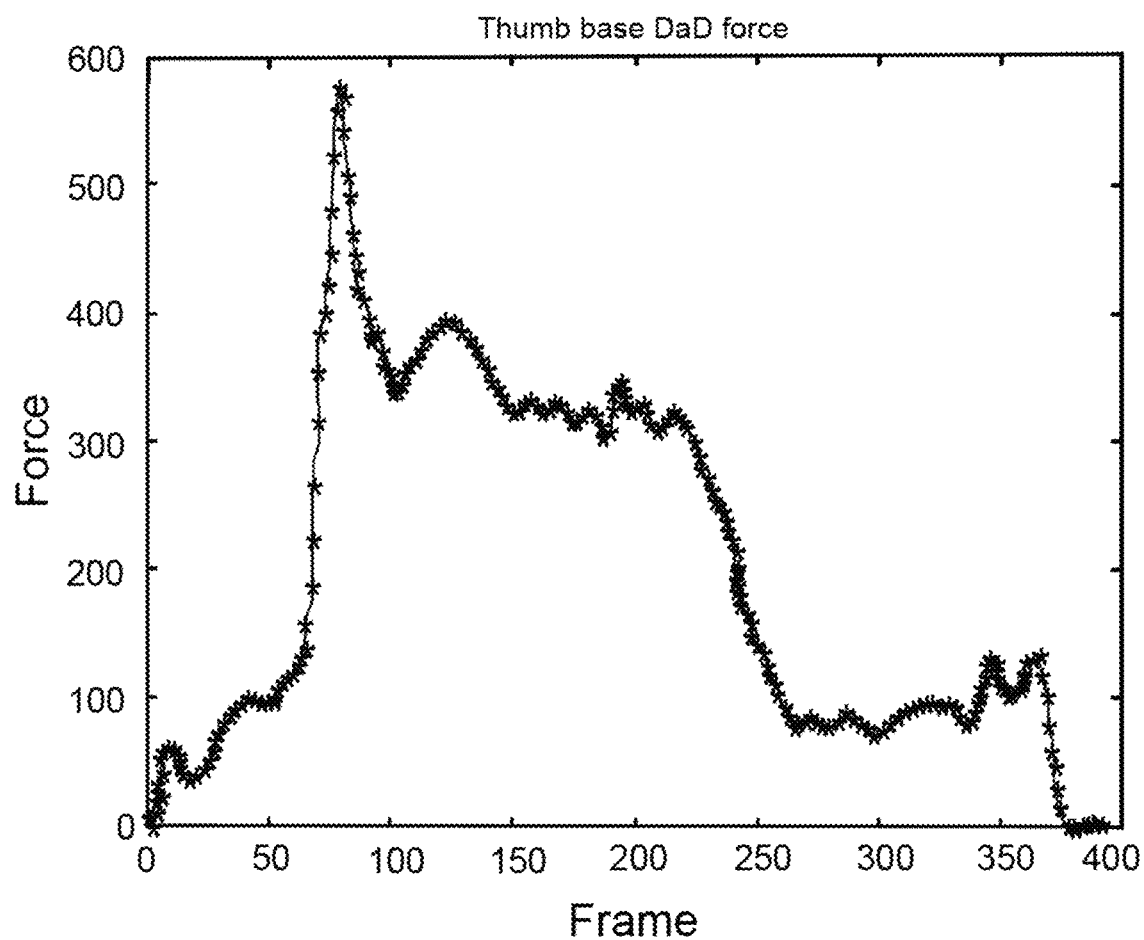
FIG. 15 shows the forces exerted on the touchpad by the base of a user's thumb during the drag and drop input sequence.

FIG. 15 shows the forces exerted on the touchpad by the base of a user's thumb during the drag and drop input sequence.

As noted above, in some examples a push force event is detected if either (1) the absolute value of the force exceeds a force threshold up value ForceThrUp, or (2) the force gradient of the current frame (n) with respect to the second previous frame (n−2) is above a force differential threshold up value ForceDiffThrUp. In this situation, a force up flag is set and a "force mode" is entered for a predetermined number ForceCounterUp of subsequent frames of data. During the force mode, and on condition that a double tap is not detected (e.g., the double tap flag is not set), the jitter restrictor range is increased based upon the track size: if the track size is small the jitter restrictor range is set to ForceJitResAddUpSmall; if the track size is medium the jitter restrictor range is set to ForceJitResAddUpMedium; and if the track size is large the jitter restrictor range is set to ForceJitResAddUpBig. If a double tap is detected (the double tap flag is set), then the jitter restrictor range is increased by larger amounts (as compared to no double tap) based upon the track size: if the track size is small the jitter restrictor range is set to ForceJitResAddDownSmall; if the track size is medium the jitter restrictor range is set to ForceJitResAddDownMedium; and if the track size is large the jitter restrictor range is set to ForceJitResAddDownBig.

A release force event is detected if either (1) the measured force crosses a force threshold down value ForceThrDown, or (2) the force gradient of the current frame (n) with respect to the second previous frame (n−2) is below a force differential threshold down value ForceDiffThrDown. In this situation, the force up flag is removed and a "force mode" is entered for a predetermined number ForceCounterDown of subsequent frames of data. Additionally, a double tap flag is set for a predetermined number DoubleTapCounterThr of subsequent frames, such as 50 frames. If another push force event is detected within the DoubleTapCounterThr number of subsequent frames, then the algorithms determine that a double tap event has occurred. As noted above, when a double tap event is detected, the jitter restrictor range is increased by larger amounts (as compared to no double tap) based upon the track size.

When a push force event or release force event is detected, the algorithms also move the jitter restrictor to restriction state as described in more detail below.

One example of pseudocode for determining push force and release force events and setting jitter restrictor ranges is:

```
% Trackpad push event
if (Force(n)>=ForceThrUp AND Force(n-1)<ForceThrUp AND ForceFlag=0) OR ... ((Force(n)-Force(n-2))>ForceDiffThrUP AND Force(n-2)>ForceMinimalForGrad)
    if DoubleTapCounter
        JitterRestRangeAdd=ForceJitResAddDown;  (according to the track size)
    else
        JitterRestRangeAdd=ForceJitResAddUp;  (according to the track size) end
    ForceCounter=ForceCounterUp;
    if (Force(n)>=ForceThrUp AND Force(n-1)<ForceThrUp AND ForceFlag=0) ForceFlag=1;
    end
    JitterRestState=RestricionState;
end
% Trackpad release event
if (Force(n)<=ForceThrDown AND Force(n-1)>ForceThrDown AND ForceFlag=1) OR ... ((Force(n)-Force(n-2)<-ForceDiffThrDown)
    if (Force(n)<=ForceThrDown AND Force(n-1)>ForceThrDown AND ForceFlag=1) ForceFlag=0;
        DoubleTapCounter=DoubleTapCounterThr;
    end
    if ForceFlag AND ~DoubleTapCounter
        JitterRestRangeAdd=ForceJitResAddUp;  (according to the track size)
    else
        JitterRestRangeAdd=ForceJitResAddDown;  (according to the track size)
    end
    ForceCounter=ForceCounterDown;
    JitterRestState=RestricionState;
end
if ForceCounter
    JittterRestRangeUpd=JitterRestRange+JitterRestRangeAdd;
else
    JittterRestRangeUpd=JitterRestRange;
end
```

As noted above, the jitter restrictor algorithms comprise a jitter restrictor state machine. The jitter restrictor has two states: Restrict and NoRestrict. The jitter restrictor can restrict intermediate coordinates in the Restrict state and does not restrict intermediate coordinates in the NoRestrict state. If a force event as described above is detected, the jitter restrictor enters the Restrict state. Additionally, if a predetermined number of consecutive frames, such as 10 frames, exhibit coordinate movement below a restriction threshold value, then the jitter restrictor is transitioned from the NoRestrict state to the Restrict state, and subsequent coordinates are restricted. In this manner and as noted above, the jitter restrictor algorithms differentiate between user-intended, slow or gentle movement on the touchpad 120 and unintended contacts and/or noise. Where measured coordinate movement is below the restriction threshold value for the predetermined number of consecutive frames, this indicates a user is not intending to move/change her contact on the touchpad 120, and jitter restriction is engaged.

In the NoRestrict state, the jitter restrictor measures the distance between the current and previous frames' intermediate coordinates. If the distance is below the jitter restrictor range divided by two, and the jitter restrictor counter is zero, then the jitter restrictor counter increments and the intermediate coordinate of the previous frame becomes a reference point. The distances of each subsequent frame's intermediate coordinate are measured against the reference point. If the distances are below the jitter restrictor range divided by two, then the jitter restrictor counter continues to increment.

If the jitter restrictor counter reaches or passes a number of cycles for restriction threshold value NumOfCyclesForRestriction, then the jitter restrictor moves into the Restrict state and subsequent frames' intermediate coordinates are restricted (e.g., the prior frame's coordinate is utilized). If one of the measured distances from the reference point exceeds the jitter restrictor range divided by two, then the jitter restrictor counter is zeroed and the reference point is no longer valid. If the track is in "force mode" as described above, then the jitter restrictor counter increments by 2. If the track is not in "force mode," then the jitter restrictor counter increments by 1. As noted above, force events immediately move the jitter restrictor to the Restrict state.

At the entrance to the Restrict state, if the algorithms determine that restriction is needed for current frame (n) (e.g., the algorithms determine that the distance between the intermediate coordinate for current frame (n) and the intermediate coordinate for the previous frame (n−1) is within the selected jitter restriction range), then the intermediate coordinate of the previous frame (n−1) becomes the reference point. For the next (n+1) frame of data, the distance between this frame's intermediate coordinate and the reference point is measured. If this distance is within the jitter restrictor range, then the intermediate coordinate of this (n+1) frame is restricted, meaning it is set to the intermediate coordinate of the previous (n) frame (reference point).

If the measured distance between the (n+1) frame's intermediate coordinate and the reference point is above the jitter restrictor range, then the offset between the (n+1) frame's measured coordinate and the previous frame (n) intermediate coordinate is measured on both axes. The new intermediate coordinates for the (n+1) frame are the measured coordinates of the (n+1) frame minus the offset. Advantageously, by subtracting the offset the jitter restrictor algorithms avoid causing a coordinate jump when restriction is ceased. Also, the jitter restrictor moves to the NoRestrict state, and the offset continues to be subtracted from subsequent measured coordinates to avoid a coordinate jump while the current track is active.

One example of pseudocode for determining push force and release force events and setting jitter restrictor ranges is:

```
% NoRestrict state
if JitRestCounter==0
   DistX=abs(Intermediate.X(n)−Intermediate.X(n−1));
   DistY=abs(Intermediate.Y(n)−Intermediate.Y(n−1));
   if     DistX<JittterRestRangeUpd/2     AND
      DistY<JittterRestRangeUpd/2
      if ForceCounter
         JitRestCounter=JitRestCounter+2;
      else
         JitRestCounter=JitRestCounter+1;
      end
      ReferencePoint.X=Intermediate.X(n−1);
      ReferencePoint.Y=Intermediate.Y(n−1);
   end
elseif JitRestCounter<NumOfCyclesForRestriction
   DistX=abs(Intermediate.X(n)−ReferencePoint.X);
   DistY=abs(Intermediate.Y(n)−ReferencePoint.Y);
   if     DistX<JittterRestRangeUpd/2     AND
      DistY<JittterRestRangeUpd/2
      if ForceCounter
         JitRestCounter=JitRestCounter+2;
      else
         JitRestCounter=JitRestCounter+1;
      end
   else
      JitRestCounter=0;
   end
end
% Restrict state
if JitRestCounter>=NumOfCyclesForRestriction
   if RestrictionFlag
      DistX=abs(Intermediate.X(n)−ReferencePoint.X);
      DistY=abs(Intermediate.X(n)−ReferencePoint.X);
   else
      DistX=abs(Intermediate.X(n)−Intermediate.X(n−1));
      DistY=abs(Intermediate.X(n)−Intermediate.X(n−1));
   end
   if     DistX<JittterRestRangeUpd     AND
      DistY<JittterRestRangeUpd
      if !RestrictionFlag
         ReferencePoint.X=Intermediate.X(n−1);
         ReferencePoint.Y=Intermediate.Y(n−1);
         RestrictionFlag=1;
      end
      Intermediate.X(n)=ReferencePoint.X;
      Intermediate.Y (n)=ReferencePoint.Y;
   else
      if RestrictionFlag
         OffsetX=Measured.X(n−1)−ReferencePoint.X;
         OffsetY=Measured.Y(n−1)−ReferencePoint.Y;
         Intermediate.X(n)=Measured.X(n)−OffsetX;
         Intermediate.Y(n)=Measured.Y(n)−OffsetY;
         RestrictionFlag=0;
      end
      JitRestCounter=0;
   end
end
```

With reference again to FIG. 8, after the jumps detector and jitter restrictor, track smoothing algorithms in the form of a track smoothing filter can be executed on the intermediate coordinate. In some examples, the smoothing filter is executed on the intermediate coordinate only if the intermediate coordinate was not restricted by the jitter restrictor, RestrictionFlag==0. In these examples if the intermediate coordinate was restricted by the jitter restrictor, then the final coordinate will be the final coordinate of the previous frame. Advantageously, by refraining from applying the smoothing filter where the intermediate coordinate was restricted by the jitter restrictor, the final coordinate from the previous frame is not altered by the smoothing filter, thereby representing no movement of the touch contact on the touchpad.

In some examples, the smoothing filter is an exponential weighted moving average filter with bias correction. The bias correction feature utilizes the track counter of frames, such that the frames of the track from track opening until track closing are counted. If the counter reaches its maximum value while the track is active, the counter remains at the maximum value for the remainder of the track.

At the beginning of a track, the "History" (the previous final coordinate after the smoothing filter) is set to zero if it is a nonzero value. The History value is zeroed at the track closing.

One example of pseudocode for executing the smoothing filter is:

```
if RestrictionFlag
   Final.X(n)=Final.X(n−1);
   Final.Y(n)=Final.Y(n−1);
else
   TrackCounter=TrackCounter+1;
   History.X=SmoothingAlpha*History.X+(1−SmoothingAlpha)*Intermediate.X(n);
   if TrackCounter>1
      Final.X(n)=History.X/(1−SmoothingAlpha^TrackCounter);
   end
   History.Y=SmoothingAlpha*History.Y+(1−SmoothingAlpha)*Intermediate.Y(n);
   if TrackCounter>1
      Final.Y(n)=History.Y/(1−SmoothingAlpha^TrackCounter);
   end
end
```

Figure 16:
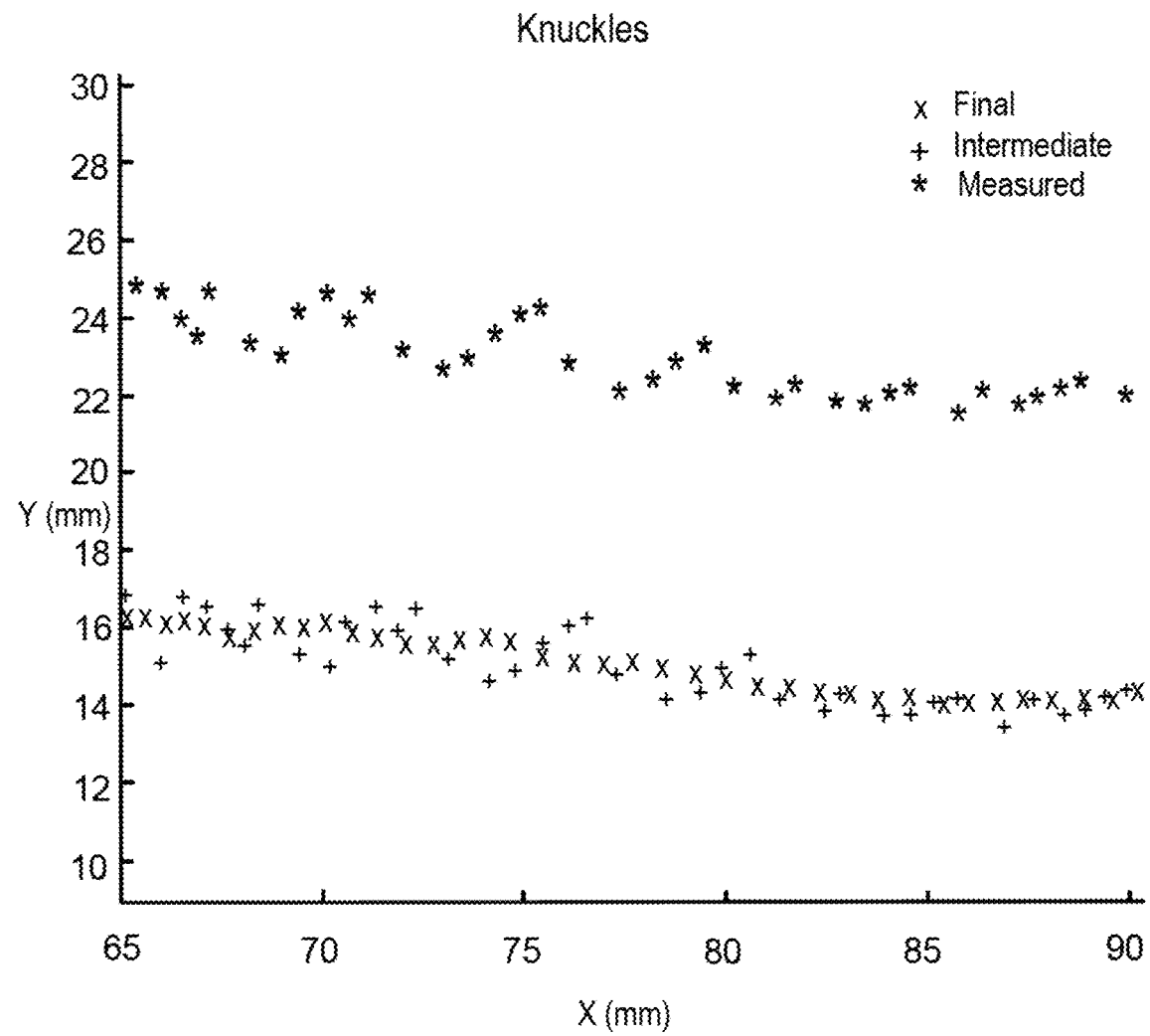
FIG. 16 shows an example of track smoothing performed on a track corresponding to a plurality of knuckles contacting and moving along the touchpad.

FIG. 16 shows an example of track smoothing which was performed on a track corresponding to a plurality of knuckles contacting and moving along the touchpad 120. As noted above, the points indicated by the + symbol are the Intermediate coordinates after jump detection and jitter restriction, and the points indicated by the X symbol are the final coordinates after application of the smoothing filter.

Figure 17:
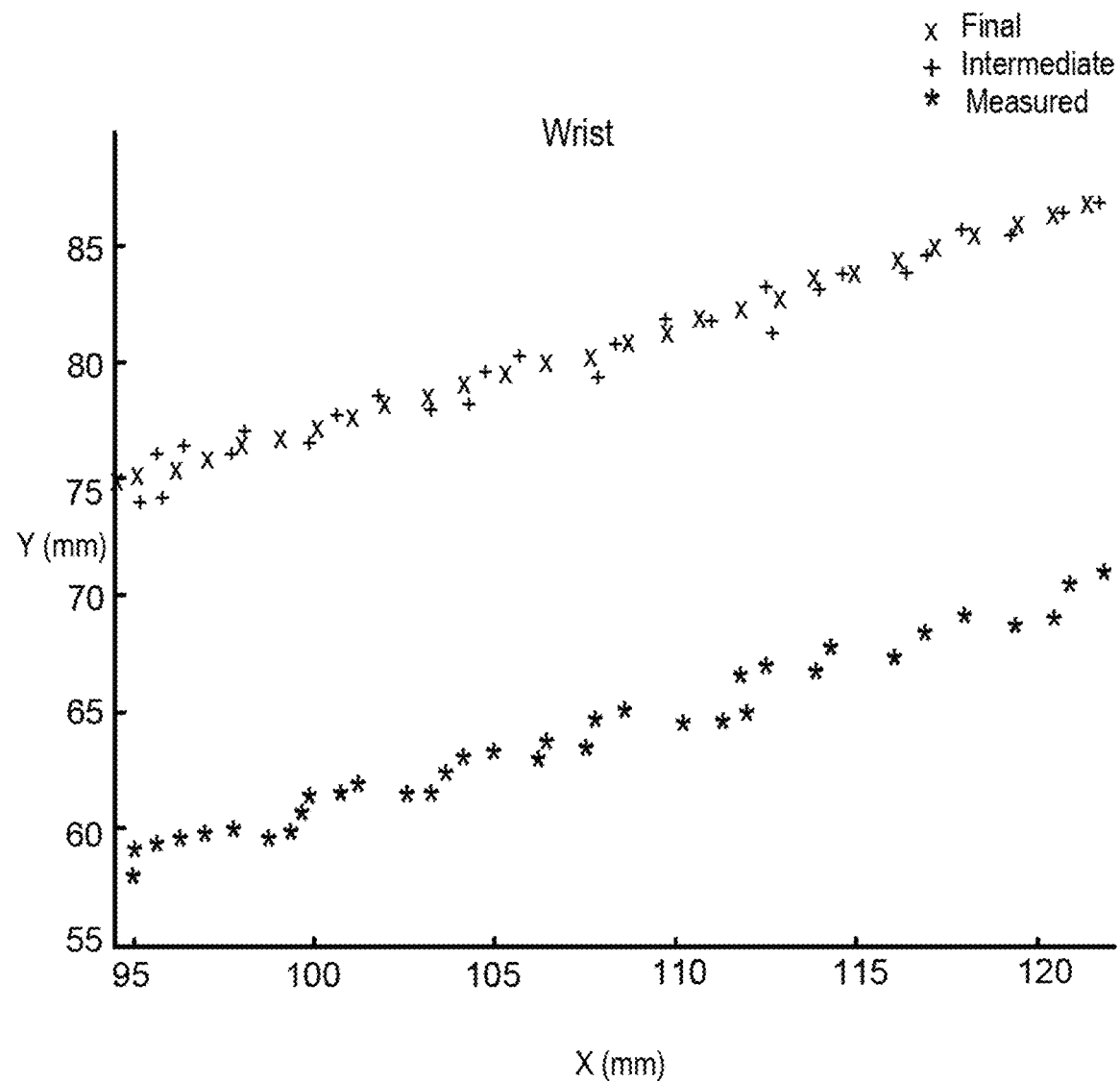
FIG. 17 shows an example of track smoothing performed on a track corresponding to a user's wrist contacting and moving along the touchpad.

FIG. 17 shows an example of track smoothing which was performed on a track corresponding to a user's wrist contacting and moving along the touchpad 120.

FIG. 18 is a table of example value ranges for thresholds and parameters described above. It will be appreciated that these thresholds and parameters can be empirically tuned for different configurations of touchpads and computing devices with which the techniques of the present disclosure are implemented. For example, different thresholds and parameters can be adjusted and tuned based upon sensor types, distances between antennas, and other hardware aspects.

FIGS. 19A-19C are tables of example value ranges for thresholds and parameters described above. It will be appreciated that these thresholds and parameters can be empirically tuned for different configurations of touchpads and computing devices with which the techniques of the present disclosure are implemented. For example, different thresholds and parameters can be adjusted and tuned based upon sensor types, distances between antennas, and other hardware aspects.

Figure 20A:
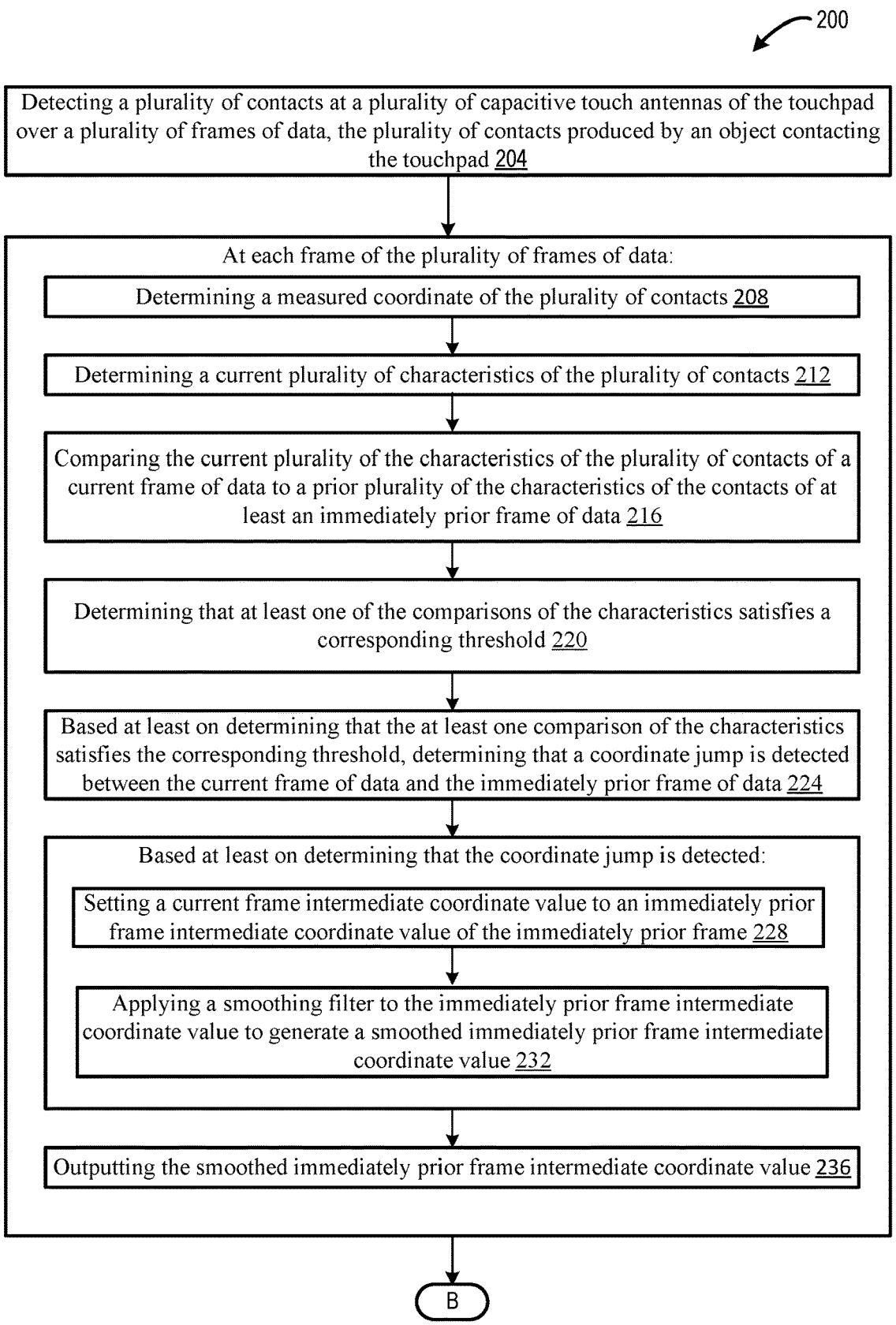
FIGS. 20A-20C are a flow chart of a method for tracking touch input on a capacitive touch sensing touchpad in a computing device according to examples of the present disclosure.
Figure 20B:
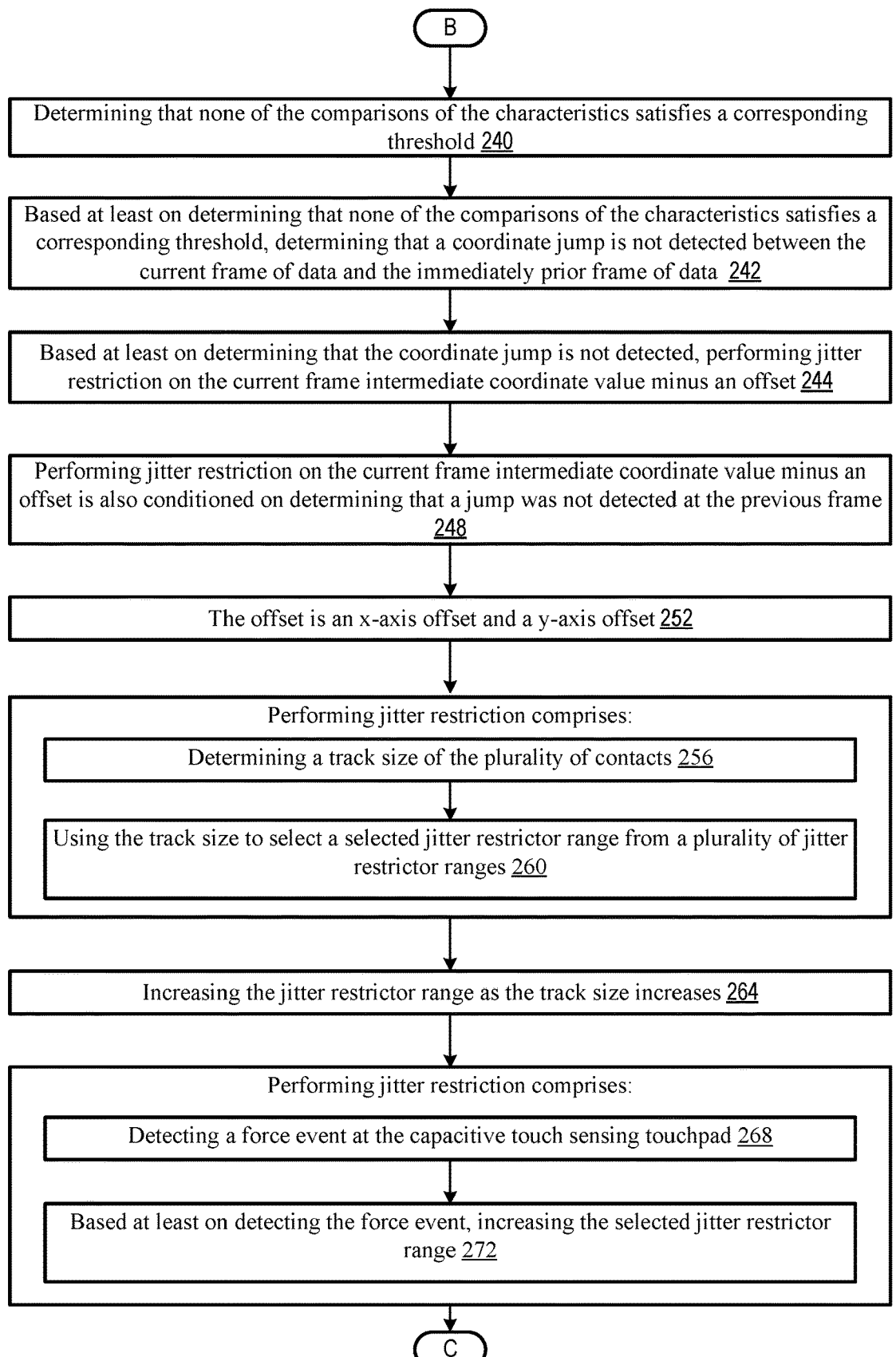
Figure 20C:
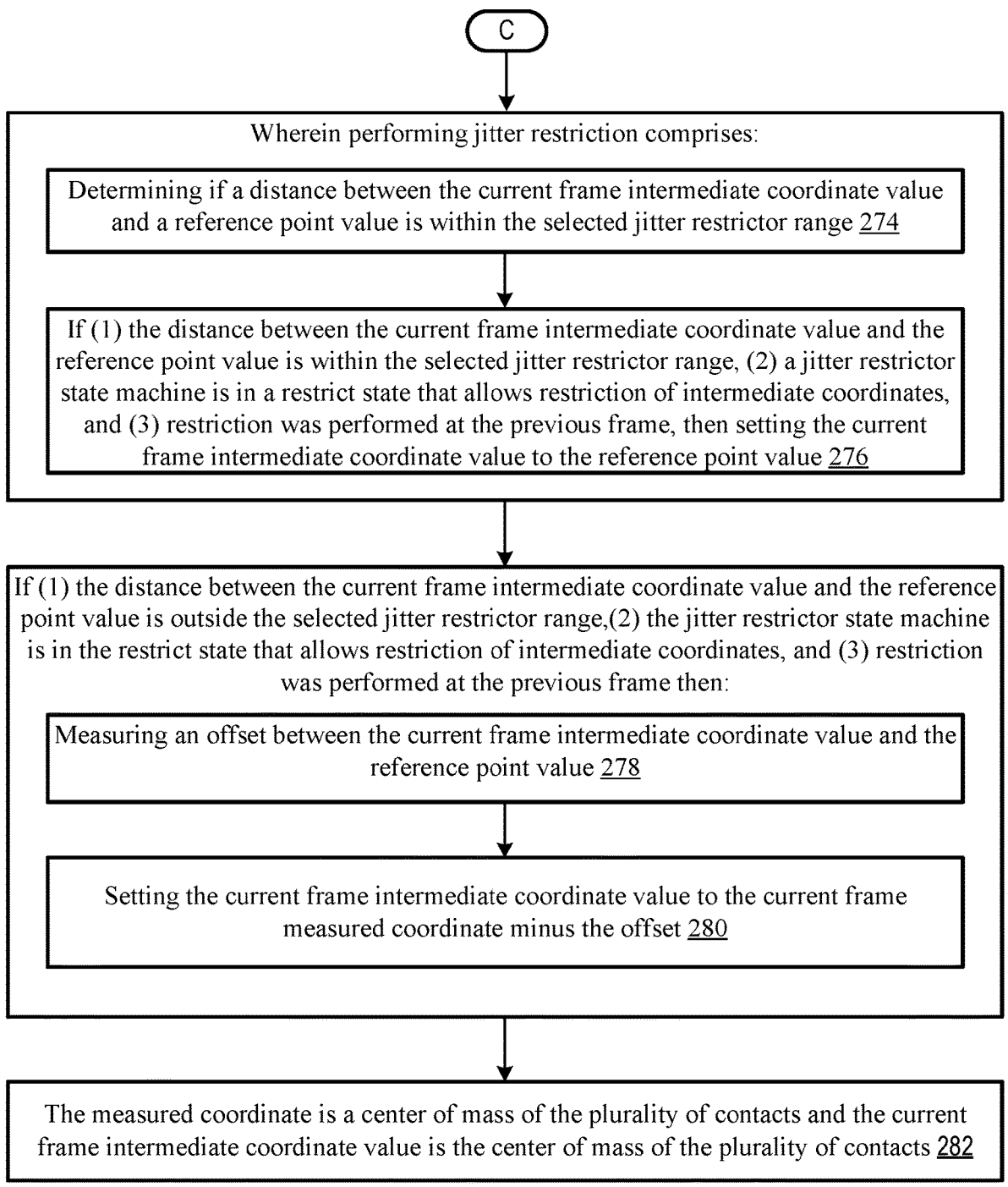

With reference now to FIGS. 20A-20C, a method 200 for tracking touch input on a capacitive touch sensing touchpad in a computing device will now be described. FIGS. 20A-20C depict a flowchart illustrating method 200. In some examples, method 200 may be implemented and performed by computing device 100 as described above. In other examples, method 200 may be implemented and performed using other touchpads and/or computing devices.

The following description of method 200 is provided by way of example and is not meant to be limiting. Therefore, it is to be understood that method 200 may include additional and/or alternative steps relative to those illustrated in FIGS. 20A-20C. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 20A, at 204 the method 200 includes detecting a plurality of contacts at a plurality of capacitive touch antennas of the touchpad over a plurality of frames of data, the plurality of contacts produced by an object contacting the touchpad. At each frame of the plurality of frames of data, the method 200 includes: at 208, determining a measured coordinate of the plurality of contacts; at 212, determining a current plurality of characteristics of the plurality of contacts; at 216, comparing the current plurality of the characteristics of the plurality of contacts of a current frame of data to a prior plurality of the characteristics of the contacts of at least an immediately prior frame of data; at 220, determining that at least one of the comparisons of the characteristics satisfies a corresponding threshold; at 224, based at least on determining that the at least one comparison of the characteristics satisfies the corresponding threshold, determining that a coordinate jump is detected between the current frame of data and the immediately prior frame of data; based at least on determining that the coordinate jump is detected: at 228, setting a current frame intermediate coordinate value to an immediately prior frame intermediate coordinate value of the immediately prior frame, and at 232, applying a smoothing filter to the immediately prior frame intermediate coordinate value to generate a smoothed immediately prior frame intermediate coordinate value; and at 236, outputting the smoothed immediately prior frame intermediate coordinate value.

With reference now to FIG. 20B, at 240 the method 200 includes, determining that none of the comparisons of the characteristics satisfies the corresponding threshold. At 242 the method 200 includes, based at least on determining that none of the comparisons of the characteristics satisfies a corresponding threshold, determining that a coordinate jump is not detected between the current frame of data and the immediately prior frame of data. At 244 the method 200 includes, based at least on determining that the coordinate jump is not detected, performing jitter restriction on the current frame intermediate coordinate value minus an offset. At 248 the method 200 includes, wherein performing jitter restriction on the current frame intermediate coordinate value minus an offset is also conditioned on determining that a jump was not detected at the previous frame. At 252 the method 200 includes, wherein the offset is an x-axis offset and a y-axis offset. At 256 the method 200 includes, wherein performing jitter restriction comprises determining a track size of the plurality of contacts. At 260 the method 200 includes using the track size to select a selected jitter restrictor range from a plurality of jitter restrictor ranges.

At 264 method 200 includes increasing the jitter restrictor range as the track size increases. At 268 the method 200 includes, wherein performing jitter restriction further comprises detecting a force event at the capacitive touch sensing touchpad. At 272 the method 200 includes, based at least on detecting the force event, increasing the selected jitter restrictor range. With reference now to FIG. 20C, at 274 the method 200 includes, wherein performing jitter restriction comprises determining if a distance between the current frame intermediate coordinate value and a reference point value is within the selected jitter restrictor range. At 276 the method 200 includes, if (1) the distance between the current frame intermediate coordinate value and the reference point value is within the selected jitter restrictor range, (2) a jitter restrictor state machine is in a restrict state that allows restriction of intermediate coordinates, and (3) restriction was performed at the previous frame, then setting the current frame intermediate coordinate value to the reference point value.

At 278 the method 200 includes, if (1) the distance between the current frame intermediate coordinate value and the reference point value is outside the selected jitter restrictor range, (2) the jitter restrictor state machine is in the restrict state that allows restriction of intermediate coordinates, and (3) restriction was performed at the previous frame, then measuring an offset between the current frame intermediate coordinate value and the reference point value. At 280 the method 200 includes setting the current frame intermediate coordinate value to the current frame measured coordinate minus the offset. At 282 the method 200 includes, wherein the measured coordinate is a center of mass of the plurality of contacts and the current frame intermediate coordinate value is the center of mass of the plurality of contacts.

The following paragraphs provide additional support for the claims of the subject application. One aspect provides a method for tracking touch input on a capacitive touch sensing touchpad in a computing device, the method comprising: detecting a plurality of contacts at a plurality of capacitive touch antennas of the touchpad over a plurality of frames of data, the plurality of contacts produced by an object contacting the touchpad; at each frame of the plurality of frames of data: determining a measured coordinate of the plurality of contacts; determining a current plurality of characteristics of the plurality of contacts; comparing the current plurality of characteristics of the plurality of contacts of a current frame of data to a prior plurality of the characteristics of the contacts of at least an immediately prior frame of data; determining that at least one of the comparisons of the characteristics satisfies a corresponding threshold; based at least on determining that the at least one comparison of the characteristics satisfies the corresponding threshold, determining that a coordinate jump is detected between the current frame of data and the immediately prior frame of data; based at least on determining that the coordinate jump is detected: setting a current frame intermediate coordinate value to an immediately prior frame intermediate coordinate value of the immediately prior frame; and applying a smoothing filter to the immediately prior frame intermediate coordinate value to generate a smoothed immediately prior frame intermediate coordinate value; and outputting the smoothed immediately prior frame intermediate coordinate value. The method may additionally or alternatively include, determining that none of the comparisons of the characteristics satisfy a corresponding threshold; based at least on determining that none of the comparisons of the characteristics satisfy a corresponding threshold, determining that a coordinate jump is not detected between the current frame of data and the immediately prior frame of data; and based at least on determining that the coordinate jump is not detected, performing jitter restriction on the current frame intermediate coordinate value minus an offset. The method may additionally or alternatively include, wherein performing jitter restriction on the current frame intermediate coordinate value minus an offset is also conditioned on determining that a jump was not detected at the previous frame. The method may additionally or alternatively include, wherein the offset is an x-axis offset and a y-axis offset. The method may additionally or alternatively include, wherein performing jitter restriction comprises: determining a track size of the plurality of contacts; and using the track size to select a selected jitter restrictor range from a plurality of jitter restrictor ranges. The method may additionally or alternatively include increasing the jitter restrictor range as the track size increases. The method may additionally or alternatively include, wherein performing jitter restriction further comprises: detecting a force event at the capacitive touch sensing touchpad; and based at least on detecting the force event, increasing the selected jitter restrictor range. The method may additionally or alternatively include, wherein performing jitter restriction comprises: determining if a distance between the current frame intermediate coordinate value and a reference point value is within the selected jitter restrictor range; and if (1) the distance between the current frame intermediate coordinate value and the reference point value is within the selected jitter restrictor range, (2) a jitter restrictor state machine is in a restrict state that allows restriction of intermediate coordinates, and (3) restriction was performed at the previous frame, then setting the current frame intermediate coordinate value to the reference point value. The method may additionally or alternatively include, if (1) the distance between the current frame intermediate coordinate value and the reference point value is outside the selected jitter restrictor range, (2) the jitter restrictor state machine is in the restrict state that allows restriction of intermediate coordinates, and (3) restriction was performed at the previous frame, then: measuring an offset between the current frame intermediate coordinate value and the reference point value; and setting the current frame intermediate coordinate value to the current frame measured coordinate minus the offset. The method may additionally or alternatively include, wherein the measured coordinate is a center of mass of the plurality of contacts and the current frame intermediate coordinate value is the center of mass of the plurality of contacts.

Another aspect provides computing device, comprising: a capacitive touch sensing touchpad; a processor; and a memory storing instructions executable by the processor to: detect a plurality of contacts at a plurality of capacitive touch antennas of the touchpad over a plurality of frames of data, the plurality of contacts produced by an object contacting the touchpad; at each frame of the plurality of frames of data: determine a measured coordinate of the plurality of contacts; determine a current plurality of characteristics of the plurality of contacts; compare the current plurality of characteristics of the plurality of contacts of a current frame of data to a prior plurality of the characteristics of the contacts of at least an immediately prior frame of data; determine that at least one of the comparisons of the characteristics satisfies a corresponding threshold; based at least on determining that the at least one comparison of the characteristics satisfies a corresponding threshold, determine that a coordinate jump is detected between the current frame of data and the immediately prior frame of data; based at least on determining that the coordinate jump is detected: set a current frame intermediate coordinate value to an immediately prior frame intermediate coordinate value of the immediately prior frame; and apply a smoothing filter to the immediately prior frame intermediate coordinate value to generate a smoothed immediately prior frame intermediate coordinate value; and output the smoothed immediately prior frame intermediate coordinate value. The computing device may additionally or alternatively include, wherein the instructions are executable by the processor to, on condition that none of the comparisons of the characteristics satisfy the corresponding threshold: determine that a coordinate jump is not detected between the current frame of data and the immediately prior frame of data; and based at least on determining that the coordinate jump is not detected, perform jitter restriction on the current frame intermediate coordinate value minus an offset. The computing device may additionally or alternatively include, wherein performing jitter restriction on the current frame intermediate coordinate value minus an offset is also conditioned on determining that a jump was not detected at the previous frame. The computing device may additionally or alternatively include, wherein the offset is an x-axis offset and a y-axis offset. The computing device may additionally or alternatively include, wherein performing jitter restriction comprises: determining a track size of the plurality of contacts; and using the track size to select a selected jitter restrictor range from a plurality of jitter restrictor ranges. The computing device may additionally or alternatively include, wherein the instructions are executable by the processor to increase the jitter restrictor range as the track size increases. The computing device may additionally or alternatively include, wherein performing jitter restriction further comprises: detecting a force event at the capacitive touch sensing touchpad; and based at least on detecting the force event, increasing the selected jitter restrictor range. The computing device may additionally or alternatively include, wherein performing jitter restriction comprises: determining if a distance between the current frame intermediate coordinate value and a reference point value is within the selected jitter restrictor range; and on condition that (1) the distance between the current frame intermediate coordinate value and the reference point value is within the selected jitter restrictor range, (2) a jitter restrictor state machine is in a restrict state that allows restriction of intermediate coordinates, and (3) restriction was performed at the previous frame, setting the current frame intermediate coordinate value to the reference point value. The computing device may additionally or alternatively include, wherein the instructions are executable by the processor to, on condition that (1) the distance between the current frame intermediate coordinate value and the reference point value is outside the selected jitter restrictor range, (2) the jitter restrictor state machine is in the restrict state that allows restriction of intermediate coordinates, and (3) restriction was performed at the previous frame: measure an offset between the current frame intermediate coordinate value and the reference point value; and set the current frame intermediate coordinate value to the current frame measured coordinate minus the offset.

Another aspect provides a computing device, comprising: a capacitive touch sensing touchpad; a processor; and a memory storing instructions executable by the processor to: detect a plurality of contacts at a plurality of capacitive touch antennas of the touchpad over a plurality of frames of data, the plurality of contacts produced by an object contacting the touchpad; at each frame of the plurality of frames of data: determine a center of mass coordinate of the plurality of contacts; determine a current plurality of characteristics of the plurality of contacts; compare the current plurality of characteristics of the plurality of contacts of a current frame of data to a prior plurality of the characteristics of the contacts of at least an immediately prior frame of data; determine that none of the comparisons of the characteristics satisfy a corresponding threshold; on condition of determining that none of the comparisons of the characteristics satisfy a corresponding threshold, determine that a coordinate jump is not detected between the current frame of data and the immediately prior frame of data; based at least on determining that the coordinate jump is not detected, perform jitter restriction on the center of mass coordinate minus an offset to generate a jitter restricted current frame intermediate coordinate value, wherein performing jitter restriction comprises: determining a track size of the plurality of contacts; and using the track size to select a selected jitter restrictor range from a plurality of jitter restrictor ranges; and output the jitter restricted current frame intermediate coordinate value.

Figure 21:
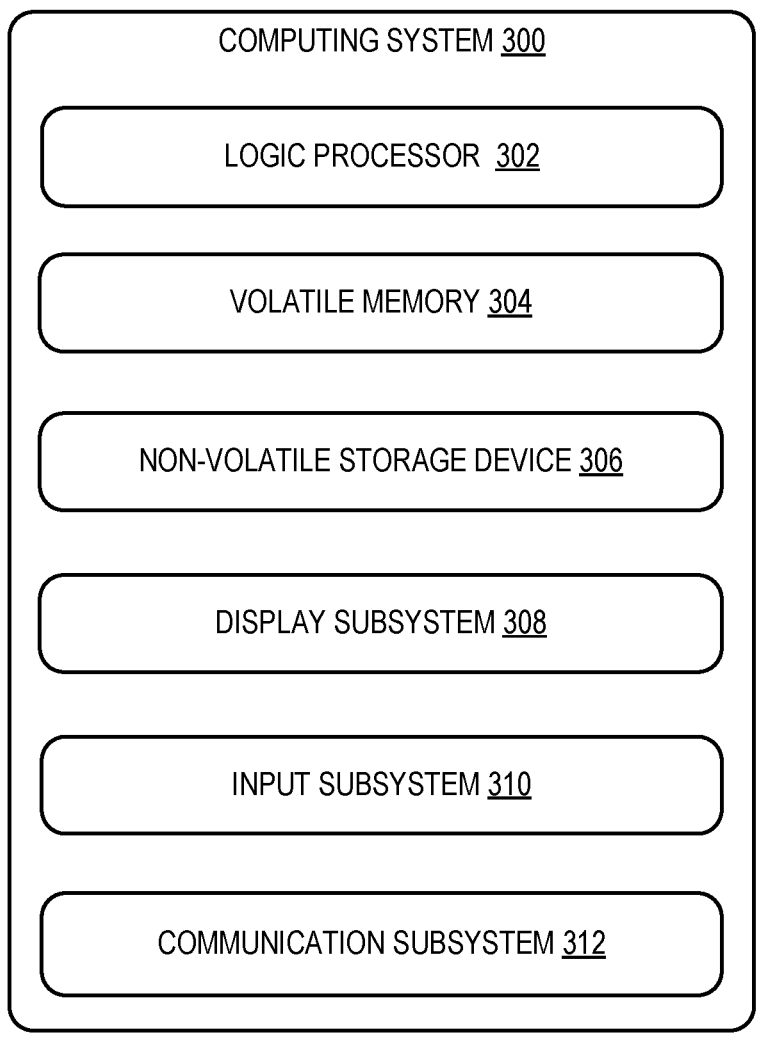
FIG. 21 shows a block diagram of an example computing system according to examples of the present disclosure.

In some embodiments, the techniques, touchpads, and components described herein may be utilized with a computing system of one or more computing devices. Similarly, the methods and processes described herein may be implemented as a computer-application program or service, an application-programming interface (API), a library, and/or other computer-program product. FIG. 21 schematically shows a non-limiting embodiment of a computing system 300 configured to provide any to all of the compute functionality described herein. Computing system 300 is shown in simplified form.

The laptop computing device 100 described above may comprise computing system 300 or one or more aspects of computing system 300. Computing system 300 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 30.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as touchpad 120, keyboard 124, touch screen display 128, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for tracking touch input on a capacitive touch sensing touchpad in a computing device, the method comprising:
   detecting a plurality of contacts at a plurality of capacitive touch antennas of the touchpad over a plurality of frames of data, the plurality of contacts produced by an object contacting the touchpad;
   at each frame of the plurality of frames of data:
   determining a measured coordinate of the plurality of contacts;
   determining a current plurality of characteristics of the plurality of contacts;
   comparing the current plurality of characteristics of the plurality of contacts of a current frame of data to a prior plurality of the characteristics of the contacts of at least an immediately prior frame of data;
   determining that at least one of the comparisons of the characteristics satisfies a corresponding threshold;
   based at least on determining that the at least one comparison of the characteristics satisfies the corresponding threshold, determining that a coordinate jump is detected between the current frame of data and the immediately prior frame of data;
   based at least on determining that the coordinate jump is detected:
      setting a current frame intermediate coordinate value to an immediately prior frame intermediate coordinate value of the immediately prior frame; and
      applying a smoothing filter to the immediately prior frame intermediate coordinate value to generate a smoothed immediately prior frame intermediate coordinate value; and
   outputting the smoothed immediately prior frame intermediate coordinate value.

2. The method of claim 1, further comprising:
   determining that none of the comparisons of the characteristics satisfy a corresponding threshold;
   based at least on determining that none of the comparisons of the characteristics satisfy a corresponding threshold, determining that a coordinate jump is not detected between the current frame of data and the immediately prior frame of data; and
   based at least on determining that the coordinate jump is not detected, performing jitter restriction on the current frame intermediate coordinate value minus an offset.

3. The method of claim 2, wherein performing jitter restriction on the current frame intermediate coordinate value minus an offset is also conditioned on determining that a jump was not detected at the previous frame.

4. The method of claim 2, wherein the offset is an x-axis offset and a y-axis offset.

5. The method of claim 2, wherein performing jitter restriction comprises:
   determining a track size of the plurality of contacts; and
   using the track size to select a selected jitter restrictor range from a plurality of jitter restrictor ranges.

6. The method of claim 5, further comprising increasing the jitter restrictor range as the track size increases.

7. The method of claim 5, wherein performing jitter restriction further comprises:
   detecting a force event at the capacitive touch sensing touchpad; and
   based at least on detecting the force event, increasing the selected jitter restrictor range.

8. The method of claim 2, wherein performing jitter restriction comprises:
   determining if a distance between the current frame intermediate coordinate value and a reference point value is within the selected jitter restrictor range; and
   if (1) the distance between the current frame intermediate coordinate value and the reference point value is within the selected jitter restrictor range, (2) a jitter restrictor state machine is in a restrict state that allows restriction of intermediate coordinates, and (3) restriction was performed at the previous frame, then setting the current frame intermediate coordinate value to the reference point value.

9. The method of claim 8, further comprising, if (1) the distance between the current frame intermediate coordinate value and the reference point value is outside the selected jitter restrictor range, (2) the jitter restrictor state machine is in the restrict state that allows restriction of intermediate coordinates, and (3) restriction was performed at the previous frame, then:
measuring an offset between the current frame intermediate coordinate value and the reference point value; and
setting the current frame intermediate coordinate value to the current frame measured coordinate minus the offset.

10. The method of claim 1, wherein the measured coordinate is a center of mass of the plurality of contacts and the current frame intermediate coordinate value is the center of mass of the plurality of contacts.

11. A computing device, comprising:
a capacitive touch sensing touchpad;
a processor; and
a memory storing instructions executable by the processor to:
detect a plurality of contacts at a plurality of capacitive touch antennas of the touchpad over a plurality of frames of data, the plurality of contacts produced by an object contacting the touchpad;
at each frame of the plurality of frames of data:
determine a measured coordinate of the plurality of contacts;
determine a current plurality of characteristics of the plurality of contacts;
compare the current plurality of characteristics of the plurality of contacts of a current frame of data to a prior plurality of the characteristics of the contacts of at least an immediately prior frame of data;
determine that at least one of the comparisons of the characteristics satisfies a corresponding threshold;
based at least on determining that the at least one comparison of the characteristics satisfies a corresponding threshold, determine that a coordinate jump is detected between the current frame of data and the immediately prior frame of data;
based at least on determining that the coordinate jump is detected:
set a current frame intermediate coordinate value to an immediately prior frame intermediate coordinate value of the immediately prior frame; and
apply a smoothing filter to the immediately prior frame intermediate coordinate value to generate a smoothed immediately prior frame intermediate coordinate value; and
output the smoothed immediately prior frame intermediate coordinate value.

12. The computing device of claim 11, wherein the instructions are executable by the processor to, on condition that none of the comparisons of the characteristics satisfy the corresponding threshold:
determine that a coordinate jump is not detected between the current frame of data and the immediately prior frame of data; and
based at least on determining that the coordinate jump is not detected, perform jitter restriction on the current frame intermediate coordinate value minus an offset.

13. The computing device of claim 12, wherein performing jitter restriction on the current frame intermediate coordinate value minus an offset is also conditioned on determining that a jump was not detected at the previous frame.

14. The computing device of claim 12, wherein the offset is an x-axis offset and a y-axis offset.

15. The computing device of claim 12, wherein performing jitter restriction comprises:
determining a track size of the plurality of contacts; and
using the track size to select a selected jitter restrictor range from a plurality of jitter restrictor ranges.

16. The computing device of claim 15, wherein the instructions are executable by the processor to increase the jitter restrictor range as the track size increases.

17. The computing device of claim 16, wherein performing jitter restriction further comprises:
detecting a force event at the capacitive touch sensing touchpad; and
based at least on detecting the force event, increasing the selected jitter restrictor range.

18. The computing device of claim 12, wherein performing jitter restriction comprises:
determining if a distance between the current frame intermediate coordinate value and a reference point value is within the selected jitter restrictor range; and
on condition that (1) the distance between the current frame intermediate coordinate value and the reference point value is within the selected jitter restrictor range, (2) a jitter restrictor state machine is in a restrict state that allows restriction of intermediate coordinates, and (3) restriction was performed at the previous frame, setting the current frame intermediate coordinate value to the reference point value.

19. The computing device of claim 18, wherein the instructions are executable by the processor to, on condition that (1) the distance between the current frame intermediate coordinate value and the reference point value is outside the selected jitter restrictor range, (2) the jitter restrictor state machine is in the restrict state that allows restriction of intermediate coordinates, and (3) restriction was performed at the previous frame:
measure an offset between the current frame intermediate coordinate value and the reference point value; and
set the current frame intermediate coordinate value to the current frame measured coordinate minus the offset.

20. A computing device, comprising:
a capacitive touch sensing touchpad;
a processor; and
a memory storing instructions executable by the processor to:
detect a plurality of contacts at a plurality of capacitive touch antennas of the touchpad over a plurality of frames of data, the plurality of contacts produced by an object contacting the touchpad;
at each frame of the plurality of frames of data:
determine a center of mass coordinate of the plurality of contacts;
determine a current plurality of characteristics of the plurality of contacts;
compare the current plurality of characteristics of the plurality of contacts of a current frame of data to a prior plurality of the characteristics of the contacts of at least an immediately prior frame of data;
determine that none of the comparisons of the characteristics satisfy a corresponding threshold;

on condition of determining that none of the comparisons of the characteristics satisfy a corresponding threshold, determine that a coordinate jump is not detected between the current frame of data and the immediately prior frame of data;
based at least on determining that the coordinate jump is not detected, perform jitter restriction on the center of mass coordinate minus an offset to generate a jitter restricted current frame intermediate coordinate value, wherein performing jitter restriction comprises:
  determining a track size of the plurality of contacts; and
  using the track size to select a selected jitter restrictor range from a plurality of jitter restrictor ranges; and
output the jitter restricted current frame intermediate coordinate value.

* * * * *